United States Patent
Masuno et al.

(10) Patent No.: US 12,323,699 B2
(45) Date of Patent: Jun. 3, 2025

(54) SIGNAL PROCESSING DEVICE, IMAGING DEVICE, AND SIGNAL PROCESSING METHOD

(71) Applicant: SONY SEMICONDUCTOR SOLUTIONS CORPORATION, Kanagawa (JP)

(72) Inventors: Tomonori Masuno, Kanagawa (JP); Masahiro Watanabe, Kanagawa (JP)

(73) Assignee: SONY SEMICONDUCTOR SOLUTIONS CORPORATION, Kanagawa (JP)

( * ) Notice: Subject to any disclaimer, the term of this patent is extended or adjusted under 35 U.S.C. 154(b) by 149 days.

(21) Appl. No.: 18/044,203

(22) PCT Filed: Jul. 29, 2021

(86) PCT No.: PCT/JP2021/028160
§ 371 (c)(1),
(2) Date: Mar. 6, 2023

(87) PCT Pub. No.: WO2022/054450
PCT Pub. Date: Mar. 17, 2022

(65) Prior Publication Data
US 2023/0328368 A1 Oct. 12, 2023

(30) Foreign Application Priority Data
Sep. 14, 2020 (JP) .................................. 2020-153940

(51) Int. Cl.
*H04N 23/65* (2023.01)
*G06T 7/55* (2017.01)
(Continued)

(52) U.S. Cl.
CPC ............... *H04N 23/65* (2023.01); *G06T 7/55* (2017.01); *G06T 7/60* (2013.01); *G06V 40/172* (2022.01);
(Continued)

(58) Field of Classification Search
CPC . G06T 2207/30201; G06T 2207/10024; G06T 2207/20076; G06T 5/50;
(Continued)

(56) References Cited

U.S. PATENT DOCUMENTS

2014/0105504 A1* 4/2014 Krupka .................... G06T 5/70
382/195
2015/0302239 A1* 10/2015 Ohba ...................... G06T 7/246
382/154

FOREIGN PATENT DOCUMENTS

| JP | 2005-284487 A | 10/2005 |
|----|---------------|---------|
| JP | 2005-293334 A | 10/2005 |

(Continued)

OTHER PUBLICATIONS

International Search Report and Written Opinion of PCT Application No. PCT/JP2021/028160, issued on Oct. 12, 2021, 11 pages of ISRWO.

*Primary Examiner* — Masum Billah
(74) *Attorney, Agent, or Firm* — CHIP LAW GROUP

(57) ABSTRACT

A signal processing device according to the present technology includes a storage unit that stores size information of a specific subject and a determination processing unit that acquires a second image as a distance image having a resolution lower than that of a first image used in identification processing of determining whether or not a subject is the specific subject. The determination processing unit performs determination of whether or not the subject in the second image is a processing target subject in the identification processing using the first image on the basis of size (Continued)

information of the subject in the second image and the size information of the specific subject.

15 Claims, 20 Drawing Sheets

(51) Int. Cl.
*G06T 7/60* (2017.01)
*G06V 40/16* (2022.01)
(52) U.S. Cl.
CPC ............... *G06T 2207/10028* (2013.01); *G06T 2207/30201* (2013.01)
(58) Field of Classification Search
CPC ........... G06T 7/593; G06T 2207/10016; G06T 2207/10021; G06T 2207/20016
USPC .......................................................... 348/77
See application file for complete search history.

(56) References Cited

FOREIGN PATENT DOCUMENTS

| | | |
|---|---|---|
| JP | 2014-106732 A | 6/2014 |
| JP | 2014-137762 A | 7/2014 |
| JP | 2016-085637 A | 5/2016 |
| JP | 2016-092593 A | 5/2016 |

\* cited by examiner

SIGNAL PROCESSING DEVICE, IMAGING DEVICE, AND SIGNAL PROCESSING METHOD

CROSS REFERENCE TO RELATED APPLICATIONS

This application is a U.S. National Phase of International Patent Application No. PCT/JP2021/028160 filed on Jul. 29, 2021, which claims priority benefit of Japanese Patent Application No. JP 2020-153940 filed in the Japan Patent Office on Sep. 14, 2020. Each of the above-referenced applications is hereby incorporated herein by reference in its entirety.

TECHNICAL FIELD

The present technology relates to a technical field of a signal processing device, an imaging device, and a signal processing method for recognizing a subject.

BACKGROUND ART

Accuracy of image recognition processing has been improved, and accordingly, systems that perform face detection processing from images have become widespread. Specifically, they are used when entering concert halls, when unlocking smartphones, and the like.

In such a face detection system, for example, as described in Patent Document 1, a plurality of images having different resolutions is generated by enlarging or reducing a captured image, and matching with a face template is performed for each image, whereby face areas of various sizes in the image can be specified.

CITATION LIST

Patent Document

Patent Document 1: Japanese Patent Application Laid-Open No. 2005-284487

SUMMARY OF THE INVENTION

Problems to be Solved by the Invention

However, in order to accept a variety of face sizes on an image, it is necessary to generate images with a large number of resolutions. Then, as the number of images targeted for the face matching processing increases, the amount of calculation required for the matching processing increases, and the power consumption also increases.

The device that performs the face detection processing is not limited to a high-performance computer device, but includes a relatively low-performance computer device such as a smartphone, and there is a demand for reduction in the amount of calculation and reduction in power consumption.

Therefore, an object of the present technology is to reduce power consumption necessary for detecting a specific subject.

Solutions to Problems

A signal processing device according to the present technology includes: a storage unit that stores size information of a specific subject; and a determination processing unit that acquires a second image as a distance image having a resolution lower than that of a first image used in identification processing of determining whether or not a subject is the specific subject, and performs determination of whether or not the subject in the second image is a processing target subject in the identification processing using the first image on the basis of size information of the subject in the second image and the size information of the specific subject.

The size of the image area of the specific subject within the angle of view of the second image can be estimated by using the size information of the specific subject and the distance information of the subject.

The determination processing unit in the signal processing device described above may specify an image area of the processing target subject in the second image as a target area.

When the target area is specified, the identification processing in the subsequent stage may be performed only for the target area.

The determination processing unit in the signal processing device described above may determine whether or not the subject is the processing target subject on the basis of similarity between a size of the specific subject and a size of the subject in the second image.

Therefore, it is possible to prevent a subject having a size different from that of the specific subject from being detected as the processing target subject.

The similarity in the signal processing device described above may be calculated using two box filters.

The operation using the box filters can be performed with a constant amount of calculation.

The determination processing unit in the signal processing device described above may determine the subject in the second image as the processing target subject in a case where a shape of the specific subject is similar to a shape of the subject in the second image.

Therefore, it is possible to prevent a subject having a shape significantly different from that of the specific subject from being detected as the processing target subject.

The determination processing unit in the signal processing device described above may determine whether or not the shape of the specific subject is similar to the shape of the subject in the second image on the basis of edge information extracted from the second image.

By determining whether or not the shapes are similar on the basis of the edge information, a subject having a similar size to the specific subject and having a similar shape to the specific subject is determined as the processing target subject.

The signal processing device described above may include an identification processing unit that performs the identification processing.

As a result of executing each processing on the second image, it is determined whether or not to execute the identification processing. Then, in a case where execution of the identification processing is determined, the identification processing unit executes the identification processing.

The identification processing unit in the signal processing device described above may perform the identification processing in a case where the determination processing unit determines that the subject in the second image is the processing target subject in the identification processing using the first image.

In a case where the subject appearing within the angle of view of the second image has a size different from that of the specific subject, it is not necessary to execute subsequent identification processing. Also in this respect, the processing load can be reduced.

The determination processing unit in the signal processing device described above may specify an image area of the processing target subject in the second image as a target area, and the identification processing unit may specify an area corresponding to the target area in an area in the first image as a corresponding area.

By specifying the corresponding area, the identification processing can be executed for an appropriate area.

The identification processing unit in the signal processing device described above may perform the identification processing on the corresponding area.

By performing the identification processing on the corresponding area, the amount of calculation of the identification processing is reduced.

In the signal processing device described above, the specific subject may be a specific person, and the identification processing unit may perform, as the identification processing, processing of determining whether or not the subject in the second image is a same person as the specific person.

The processing of determining whether or not the subject in the second image is a specific person can be used in, for example, a face authentication system.

The identification processing unit in the signal processing device described above may perform, as the identification processing, processing of determining whether or not a type of the subject in the second image is a same type as a type of the specific subject.

The processing of determining whether or not the type of the subject in the second image is the same as the type of the specific subject can be used, for example, in a case of searching for an image including a dog, in a case of searching for an image including a person, or the like.

An imaging device according to the present technology includes: a pixel array unit in which photoelectric conversion elements are arranged in an array; a storage unit that stores size information of a specific subject; and a determination processing unit that acquires a second image as a distance image having a resolution lower than that of a first image used in identification processing of determining whether or not a subject is the specific subject, and performs determination of whether or not the subject in the second image is a processing target subject in the identification processing using the first image on the basis of size information of the subject in the second image and the size information of the specific subject.

The pixel array unit in the imaging device described above may output the second image.

Since the second image has a lower resolution than the first image, the number of times of reading in the pixel array unit is reduced.

The determination processing unit in the imaging device described above may perform the determination using a corrected distance image obtained by correcting the distance image on the basis of a luminance signal output from the pixel array unit.

For example, in a case where the light emitting unit emits infrared light, it is conceivable that the depth value is large for a pixel having a luminance value lower than a threshold.

In the imaging device described above, the determination processing unit may be provided in a same sensor chip as the pixel array unit.

The processing of determining whether or not the subject in the second image is a processing target subject is performed as preprocessing of the identification processing, and as a result, in a case where it is determined that the subject is the processing target subject, subsequent identification processing is executed. That is, in a case where it is determined that the subject is not the processing target subject, the information of the second image used for the processing and the like are not transmitted to the outside of the sensor chip.

A signal processing method according to the present technology includes: storing size information of a specific subject; acquiring a second image as a distance image having a resolution lower than that of a first image used in identification processing of determining whether or not a subject is the specific subject; and determining whether or not the subject in the second image is a processing target subject in the identification processing using the first image on the basis of size information of the subject in the second image and the size information of the specific subject.

Hereinafter, embodiments will be described in the following order.

<1. Configuration of Imaging Device>
<2. Functional Configuration and Processing Outline of Signal Processing Unit>

<3. Various Processing>
<3-1. Overall Processing>
<3-2. Head Detection Processing>
<3-3. High-Resolution Image Preparation Processing>
<3-4. Identification Processing>
<4. Modifications>
<5. Summary>
<6. Present Technology>

<1. CONFIGURATION OF IMAGING DEVICE>

The signal processing device of the present technology can be applied to various arithmetic processing devices such as an imaging device and a personal computer (PC). In the following description, a case where the signal processing device of the present technology is applied to the imaging device 1 will be described as an example.

Note that the imaging device 1 may be a smartphone, a feature phone, or the like having a camera function in addition to a still camera, a video camera, or the like.

The imaging device 1 images a subject and performs processing of determining whether or not a specific subject is included in an obtained captured image. In order to perform such determination, the imaging device 1 performs simple detection processing and detailed detection processing.

In the following description, an example will be described in which the imaging device 1 is a smartphone, and face authentication is performed to unlock the smartphone. In this case, the specific subject is the face of the user who owns/uses the imaging device 1 as the smartphone.

In the simple detection processing, processing of detecting a human head is performed. Note that, in the simple detection processing, a similar subject can be detected even if the subject is not a human head. A human head-like subject detected in the simple detection processing is a subject to be processed in the subsequent detailed detection processing, and is thus described as a "processing target subject".

That is, the simple detection processing can be said to be processing of detecting a processing target subject.

In the detailed detection processing, it is determined whether or not the head-like subject detected by the simple detection processing is matched with the specific subject (that is, the face of the user of the imaging device 1).

In the following description, "head detection processing" will be described as an example of the simple detection processing. Furthermore, "identification processing" will be described as an example of the detailed detection processing.

Figure 1:
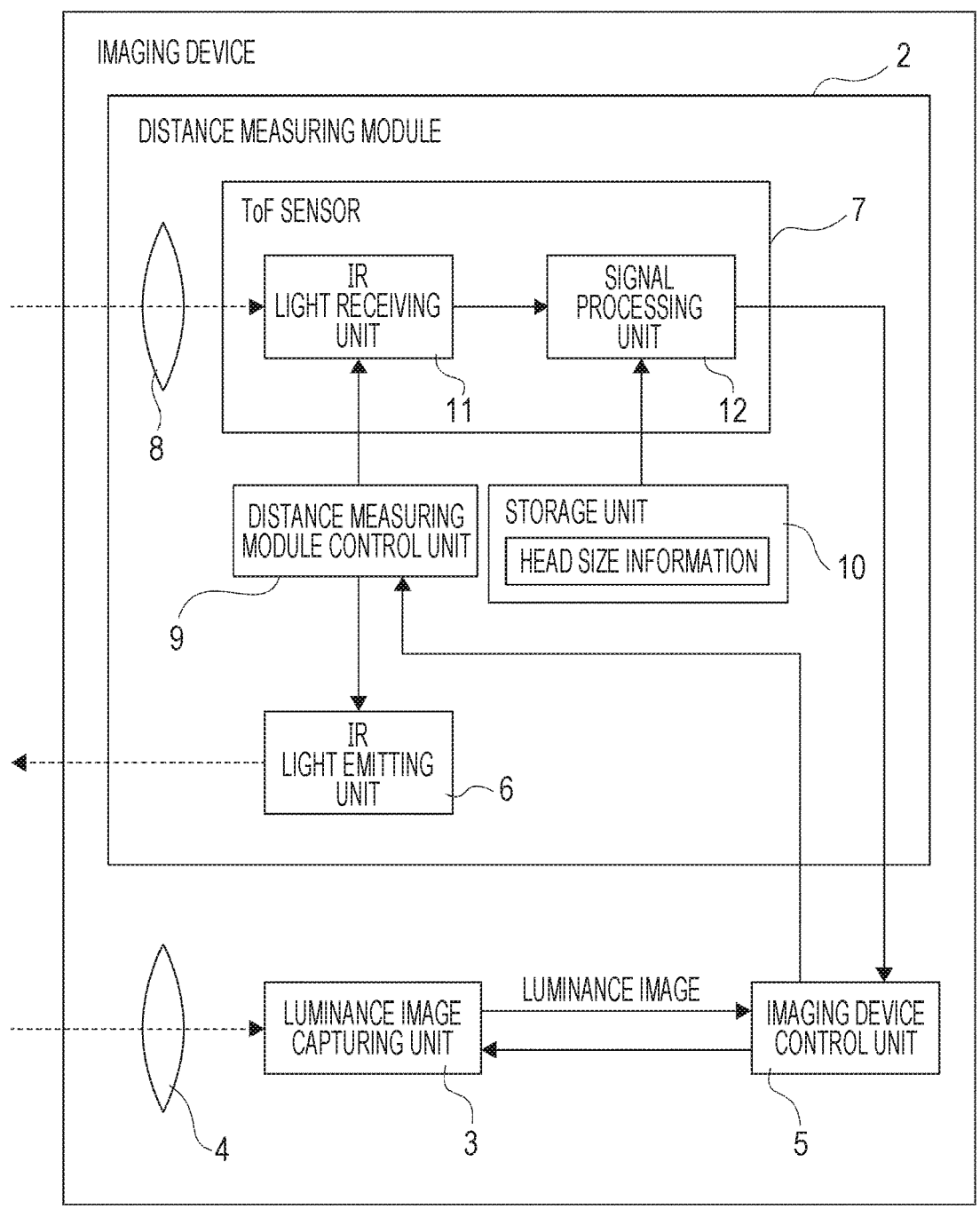
FIG. 1 is a block diagram illustrating a configuration example of an imaging device according to an embodiment of the present technology.

As illustrated in FIG. 1, the imaging device 1 includes a distance measuring module 2 that generates a distance image, a luminance image capturing unit 3 that generates a luminance image, a first lens system 4 that causes reflected light reflected by a subject to be incident on the luminance image capturing unit 3, and an imaging device control unit 5 that performs control of the luminance image capturing unit 3 and overall control of the imaging device 1.

The luminance image capturing unit 3 includes, for example, a light receiving unit in which red (R) pixels, green (G) pixels, and blue (B) pixels are arranged in a predetermined array, a reading circuit, and the like, and a portion that performs various types of signal processing, and outputs a luminance image including RGB pixel signals to the imaging device control unit 5.

The distance measuring module 2 includes an IR light emitting unit 6 that emits infrared light (IR light), a time of flight (ToF) sensor 7 that receives infrared light, a second lens system 8 that causes reflected light to be incident on the ToF sensor 7, a distance measuring module control unit 9, and a storage unit 10.

The IR light emitting unit 6 includes a light source for emitting infrared light toward a subject. The light source is, for example, an infrared light emitting diode (IRLED).

The ToF sensor 7 generates a distance image and a luminance image by a direct ToF method or an indirect ToF method. The ToF sensor 7 includes an IR light receiving unit 11 and a signal processing unit 12.

The IR light receiving unit 11 includes a plurality of light receiving elements arranged in a two-dimensional array, and the light receiving elements have sensitivity to infrared light.

Each light receiving element receives the reflected light emitted from the IR light emitting unit 6 and reflected by the subject, photoelectrically converts the reflected light to generate a charge, and outputs an electric signal corresponding to the charge according to the read operation.

Note that it is necessary to synchronize the IR light emitting unit 6 and the IR light receiving unit 11 in order to acquire a distance image and a luminance image in the ToF sensor 7. The distance measuring module control unit 9 performs a process of synchronizing the light emission timing of the IR light emitting unit 6 and the light reception timing (reset timing and read timing) of the IR light receiving unit 11.

The IR light receiving unit 11 is not only capable of reading for each pixel but also capable of addition reading in which charges accumulated in a plurality of pixels are added and read. For example, it is possible to read charges for a total of four pixels of two pixels in each of the vertical and horizontal directions in one read operation, or it is possible to read out charges for a total of 100 pixels of 10 pixels in each of the vertical and horizontal directions in one read operation.

By performing the addition reading, it is possible to suppress the power consumption of the read operation.

The signal processing unit 12 generates a distance image and a luminance image on the basis of the electric signal output from the IR light receiving unit 11. Then, the signal processing unit 12 performs the above-described head detection processing using the distance image and the luminance image. That is, the signal processing unit 12 detects a head-like object (processing target subject) using a distance image or a luminance image.

The signal processing unit 12 uses head size information stored in the storage unit 10 for the head detection processing.

The storage unit 10 stores size information of the head of a specific subject (person) as the head size information.

The head size information is acquired in advance by causing the user of the imaging device 1 to execute a registration operation.

The detection result of the head detection processing is output from the signal processing unit 12 to the imaging device control unit 5.

The imaging device control unit 5 determines whether to perform the identification processing according to the processing result of the head detection processing output from the signal processing unit 12. That is, in a case where a head-like object is detected in the head detection processing, the imaging device control unit 5 causes the luminance image capturing unit 3 to execute the imaging processing, acquires the luminance image, and performs identification processing of determining whether or not the subject of the luminance image matches the face of the user.

The identification processing is performed, for example, on the basis of a face image of the user registered in advance.

Figure 2:
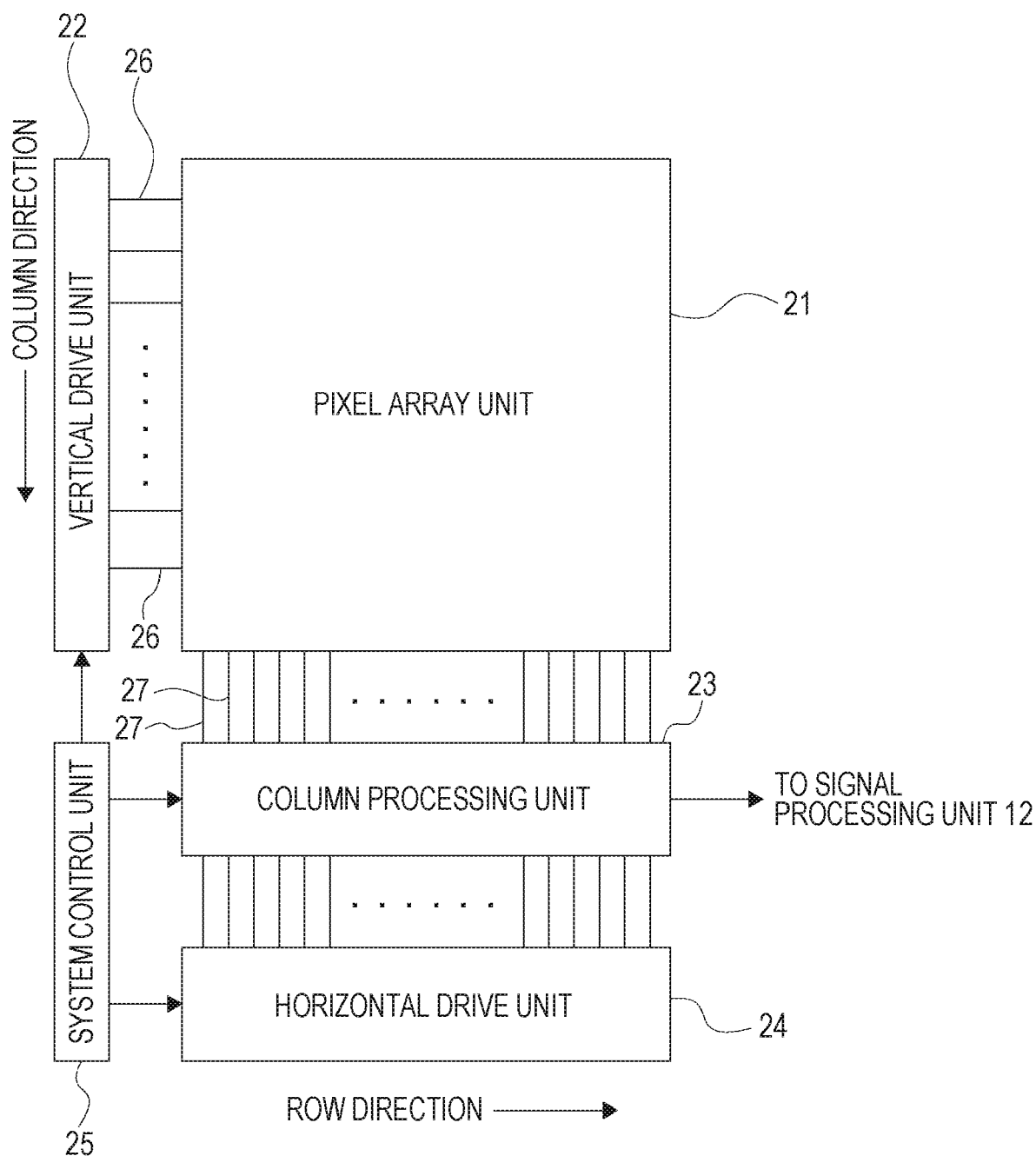
FIG. 2 is a block diagram illustrating a configuration example of an IR light receiving unit.

A configuration example of the IR light receiving unit 11 is illustrated in FIG. 2.

The IR light receiving unit 11 includes a pixel array unit 21, a vertical drive unit 22, a column processing unit 23, a horizontal drive unit 24, a system control unit 25, pixel drive lines 26, and vertical signal lines 27.

The pixel array unit 21 includes pixels having a plurality of light receiving elements arranged in a two-dimensional array.

In the pixel array unit 21, the pixel drive line 26 is wired along the row direction for each pixel row including the pixels arrayed in the row direction, and the vertical signal line 27 is wired along the column direction for each pixel column including the pixels arrayed in the column direction.

The vertical drive unit 22 includes a shift register, an address decoder, and the like, and supplies a signal or the like to each pixel via the plurality of pixel drive lines 26. Each pixel of the pixel array unit 21 is simultaneously driven for all pixels or driven in units of rows on the basis of the supplied signal.

The column processing unit 23 reads a signal from each pixel through the vertical signal line 27 for each pixel column of the pixel array unit 21.

Note that, as described above, when addition reading is performed, reading is performed via some of the vertical signal lines 27.

The horizontal drive unit 24 includes a shift register, an address decoder, and the like, and sequentially selects unit circuits corresponding to pixel columns of the column processing unit 23. By the selective scanning by the horizontal drive unit 24, the pixel signals subjected to the signal processing for each unit circuit in the column processing unit 23 are sequentially output to the subsequent signal processing unit 12.

The system control unit 25 includes a timing generator that generates various timing signals and the like, and performs drive control of the vertical drive unit 22, the column processing unit 23, and the horizontal drive unit 24 on the basis of the timing signals generated by the timing generator.

<2. FUNCTIONAL CONFIGURATION AND PROCESSING OUTLINE OF SIGNAL PROCESSING UNIT>

Figure 3:
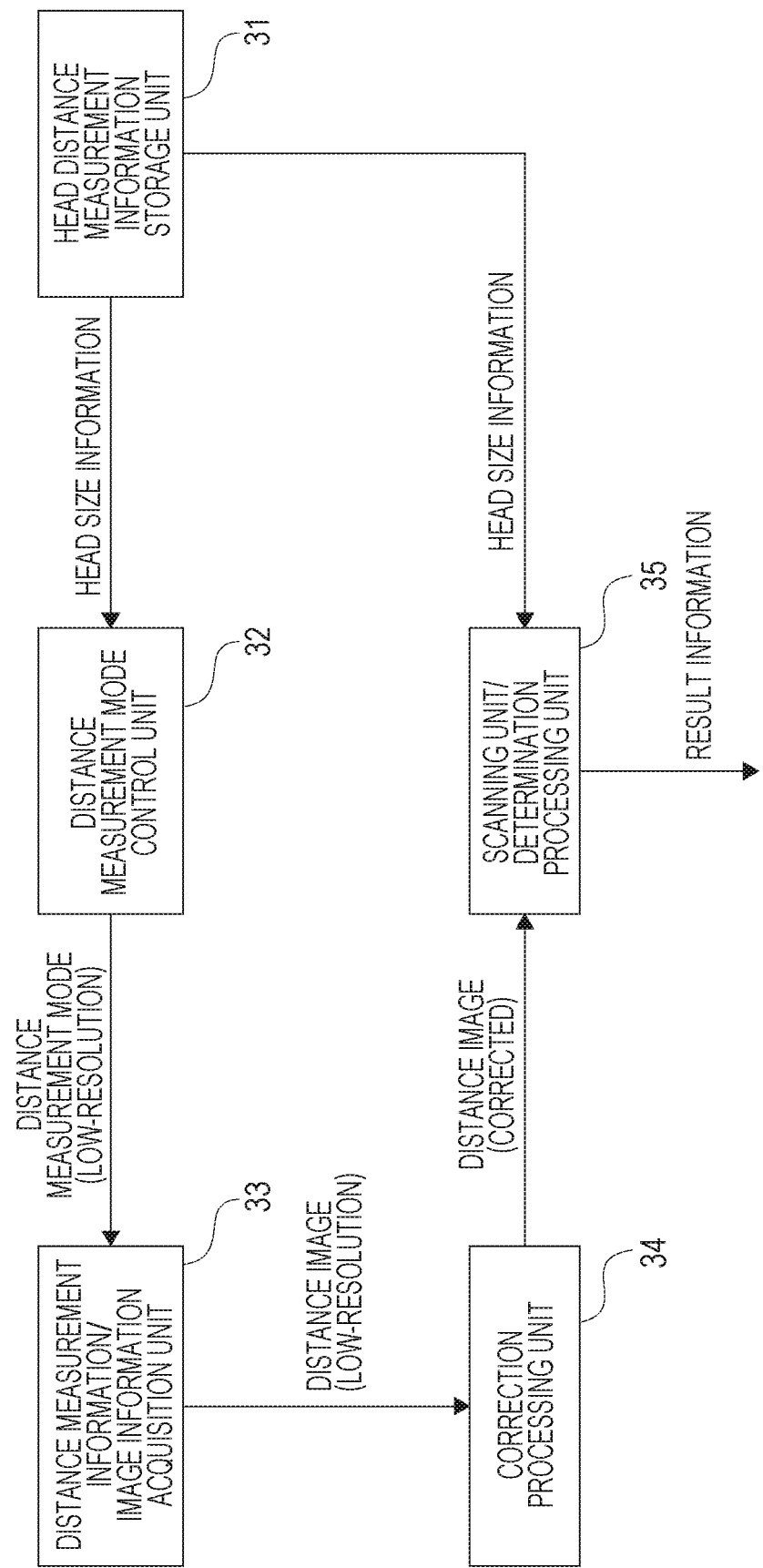
FIG. 3 is a diagram illustrating a functional configuration example of a signal processing unit.

FIG. 3 illustrates a functional configuration example of the signal processing unit 12 for executing the head detection processing.

The signal processing unit 12 includes a head distance measurement information storage unit 31, a distance measurement mode control unit 32, a distance measurement information/image information acquisition unit 33, a correction processing unit 34, and a scanning/determination processing unit 35.

The head distance measurement information storage unit 31 acquires the head size information stored in the storage unit 10, and provides the head size information to the distance measurement mode control unit 32 and the scanning/determination processing unit 35.

The distance measurement mode control unit 32 calculates the minimum resolution at which the head detection processing can be executed on the basis of the head size information. Since the head detection processing is processing of detecting a head-like subject, a high-resolution face image of the subject is not required. Furthermore, when the user uses the face authentication function for the unlock operation of the imaging device 1, it is assumed that the face is brought close to the imaging device 1 (smartphone), and thus, it is not necessary to detect the head located at a position farther than necessary from the imaging device 1 (a position 2 m or 10 m away). Therefore, the minimum resolution at which the head detection processing can be executed can be reduced. Specifically, for example, it is possible to perform the head detection processing using a distance image or a luminance image having a resolution of several hundred pixels in total including several tens of pixels in the horizontal direction and several tens of pixels in the vertical direction.

The distance measurement mode control unit 32 notifies the distance measurement information/image information acquisition unit 33 of a distance measurement mode corresponding to the calculated minimum resolution.

The distance measurement information/image information acquisition unit 33 instructs the IR light receiving unit 11 to perform addition reading, thereby acquiring a distance image based on the minimum resolution notification of which is provided. The acquired distance image is output to the correction processing unit 34.

The correction processing unit 34 determines whether or not a subject in a predetermined distance range is imaged in the input distance image, and performs correction processing for specifying an image area in which the subject is imaged in a case where the subject in the predetermined distance range can be detected.

The processing executed by the correction processing unit 34 will be specifically described with reference to FIGS. 4 to 6.

Figure 4:
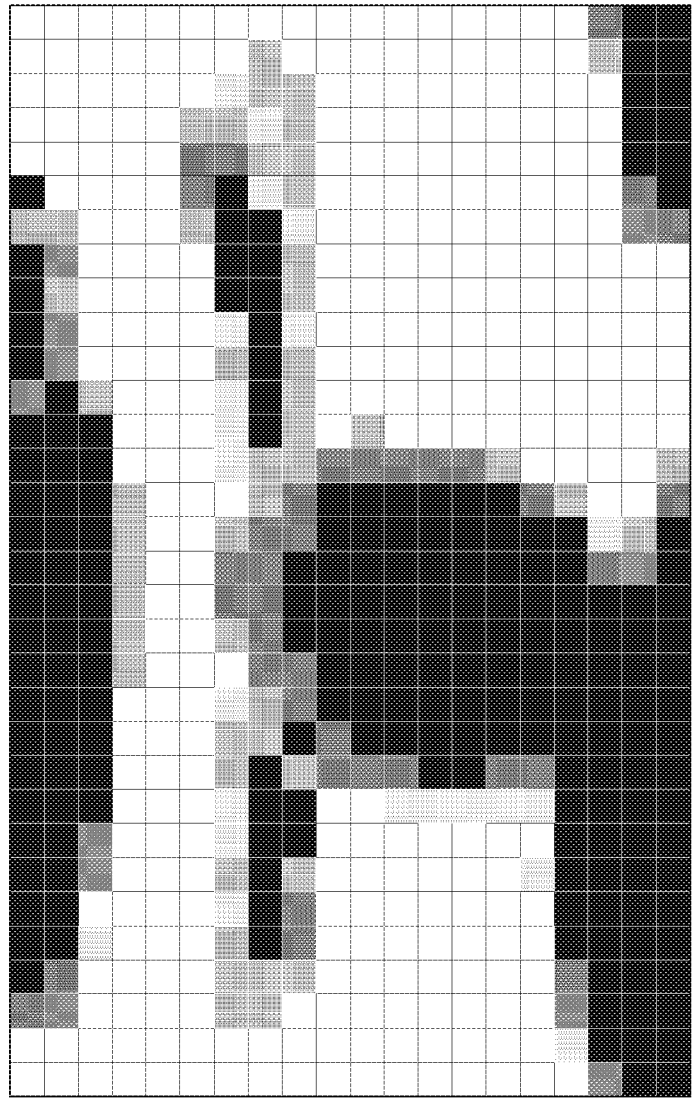
FIG. 4 is an example of a low-resolution distance image.

FIG. 4 illustrates an example of a low-resolution (total of 640 pixels of 32 horizontal pixels and 20 vertical pixels) distance image. Black pixels indicate that the distance to the subject is shorter, and white pixels indicate that the distance to the subject is longer. As illustrated in the drawing, a human head or shoulder-like subject imaged in the central portion of the image and a part of the background are detected as subjects located at a distance close to the imaging device 1.

Figure 5:
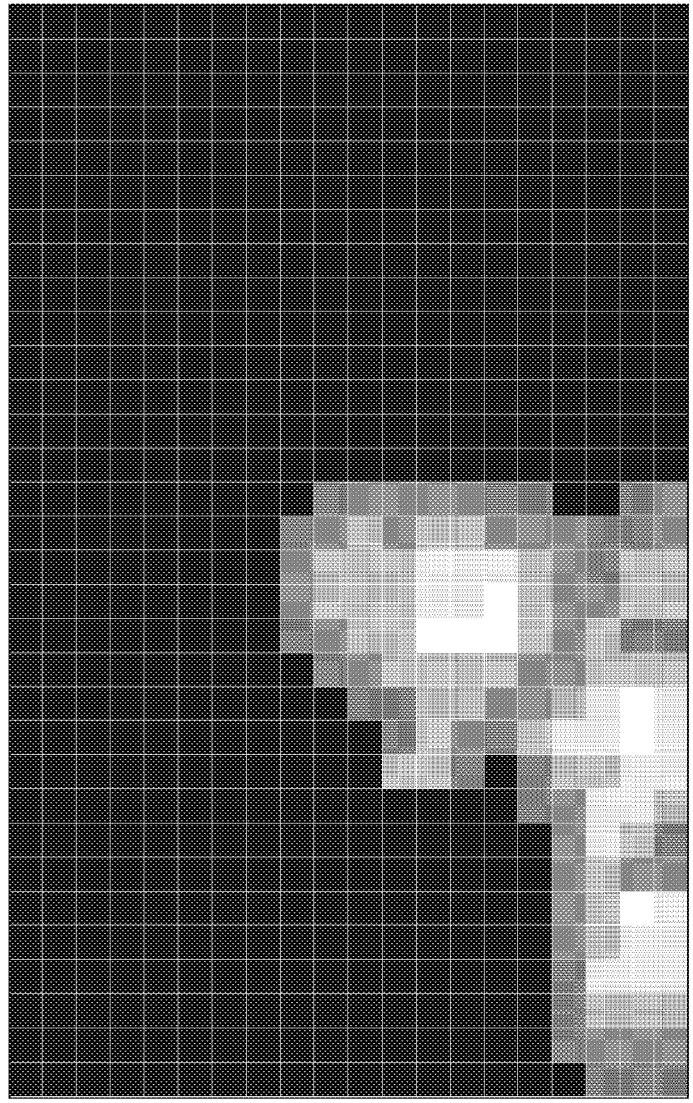
FIG. 5 is an example of a low-resolution luminance image.

FIG. 5 illustrates an example of a low-resolution luminance image generated on the basis of the electric signal output from the IR light receiving unit 11. The light emitted from the IR light emitting unit 6 is reflected by the subject and received by the IR light receiving unit 11, whereby charges are generated in each pixel of the pixel array unit 21. At this time, since the attenuation amount of light is smaller as a pixel captures an image of a subject closer to the imaging device 1, the amount of received light is increased. In the example illustrated in FIG. 5, since the luminance values of the head and shoulder portion captured in the central portion of the image are increased, only the head and shoulder-like subject is detected as a subject close to the imaging device 1.

The correction processing unit 34 executes, as correction processing, processing of replacing distance information with a large value in a pixel in which the luminance value in the luminance image is lower than a predetermined value among pixels in which the distance to the subject is short in the distance image (FIG. 4). The large value is desirably at least a value (a value indicating that the subject is far) larger than a threshold used for determining whether or not the subject is a target of the detailed detection processing in the subsequent stage. That is, in the detailed detection processing in the subsequent stage, since the detection processing is performed on at least a subject located within a predetermined distance from the imaging device 1 as a target, the distance information is corrected so that the large value is not to be a processing target subject.

Figure 6:
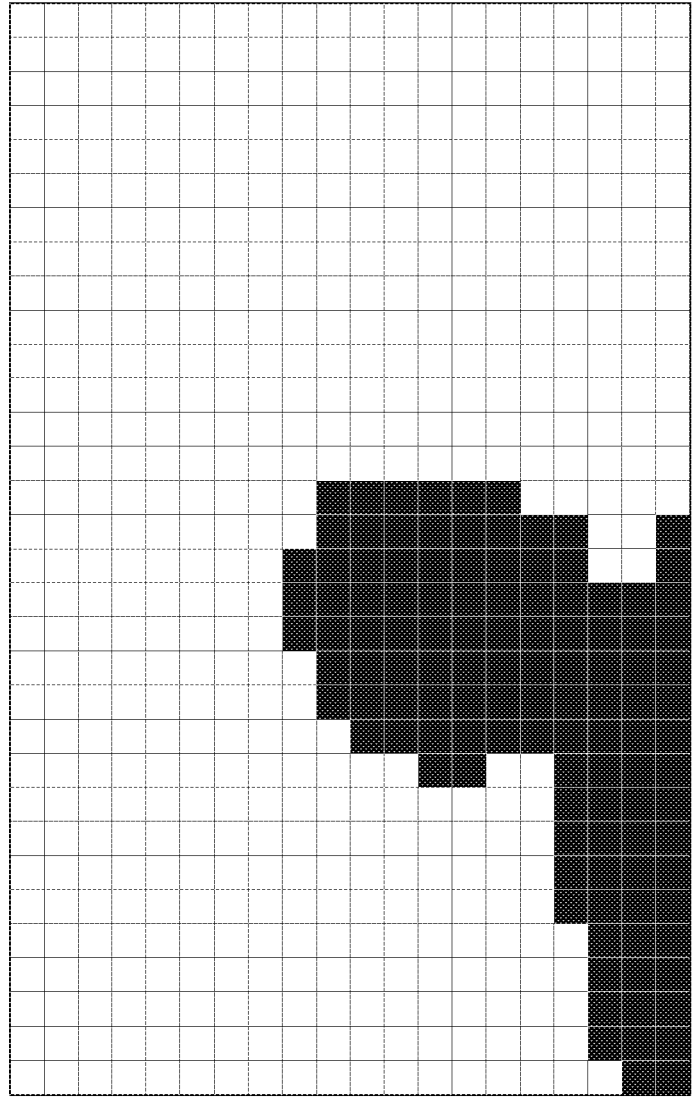
FIG. 6 is an example of a low-resolution corrected distance image.

A distance image obtained after executing the correction processing is illustrated in FIG. 6. As illustrated in the drawing, the luminance value of the luminance image (FIG. 5) is small (dark) for the pixels of the background portion in which the distance is considered to be short in the distance image (FIG. 4), and thus, the distance information is replaced with a large value. Therefore, in the corrected distance image (FIG. 6), the background portion other than the head and shoulder-like subject is indicated by white pixels indicating that the distance from the imaging device 1 to the subject is long.

In this way, even in a pixel in which the distance to the subject is assumed to be short in the distance image, a pixel having a small luminance value in the luminance image (a pixel having a small luminance signal) is regarded as a pixel having low reliability of the distance information. For a pixel regarded as a pixel having low reliability, the distance information is corrected to a large value by the correction processing. That is, the correction processing unit 34 executes correction processing of determining whether or not a subject located within a predetermined distance from the imaging device 1 is captured.

The description returns to FIG. 3.

In a case where a subject (hereinafter, described as "detection subject") located within a predetermined distance has been imaged, the corrected distance image is output from the correction processing unit 34 to the scanning/determination processing unit 35.

Not only the corrected distance image but also the head size information is input to the scanning/determination processing unit 35 from the head distance measurement information storage unit 31.

The scanning/determination processing unit 35 performs processing of determining whether or not the detection subject is a head-like object by scanning (scanning) the corrected distance image. For example, a partial area of the distance image is set as a verification area, and it is determined whether or not a head-like object is included in the verification area.

Such processing can also be said to be processing of determining whether or not to execute the detailed detection processing of the subsequent stage.

Specifically, the scanning/determination processing unit 35 sets two types of box filters (smoothing filters) using the head size information, and calculates "similarity" indicating how much the size of the detection subject is similar to the stored head size using the two types of box filters.

This will be specifically described with reference to the respective drawings of FIGS. 7 to 9.

Figure 7:
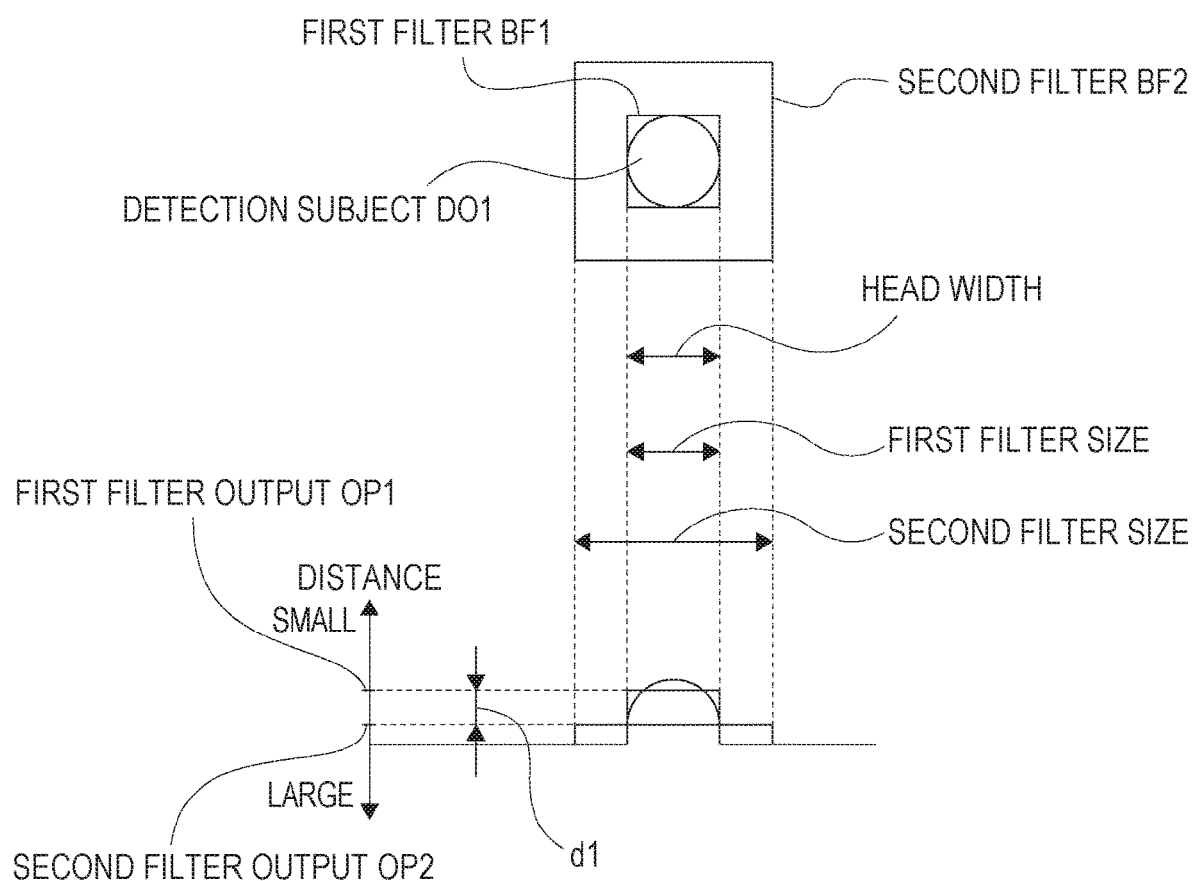
FIG. 7 is an explanatory diagram illustrating an example of similarity calculation for a subject having substantially the same size as a registered head size.
Figure 8:
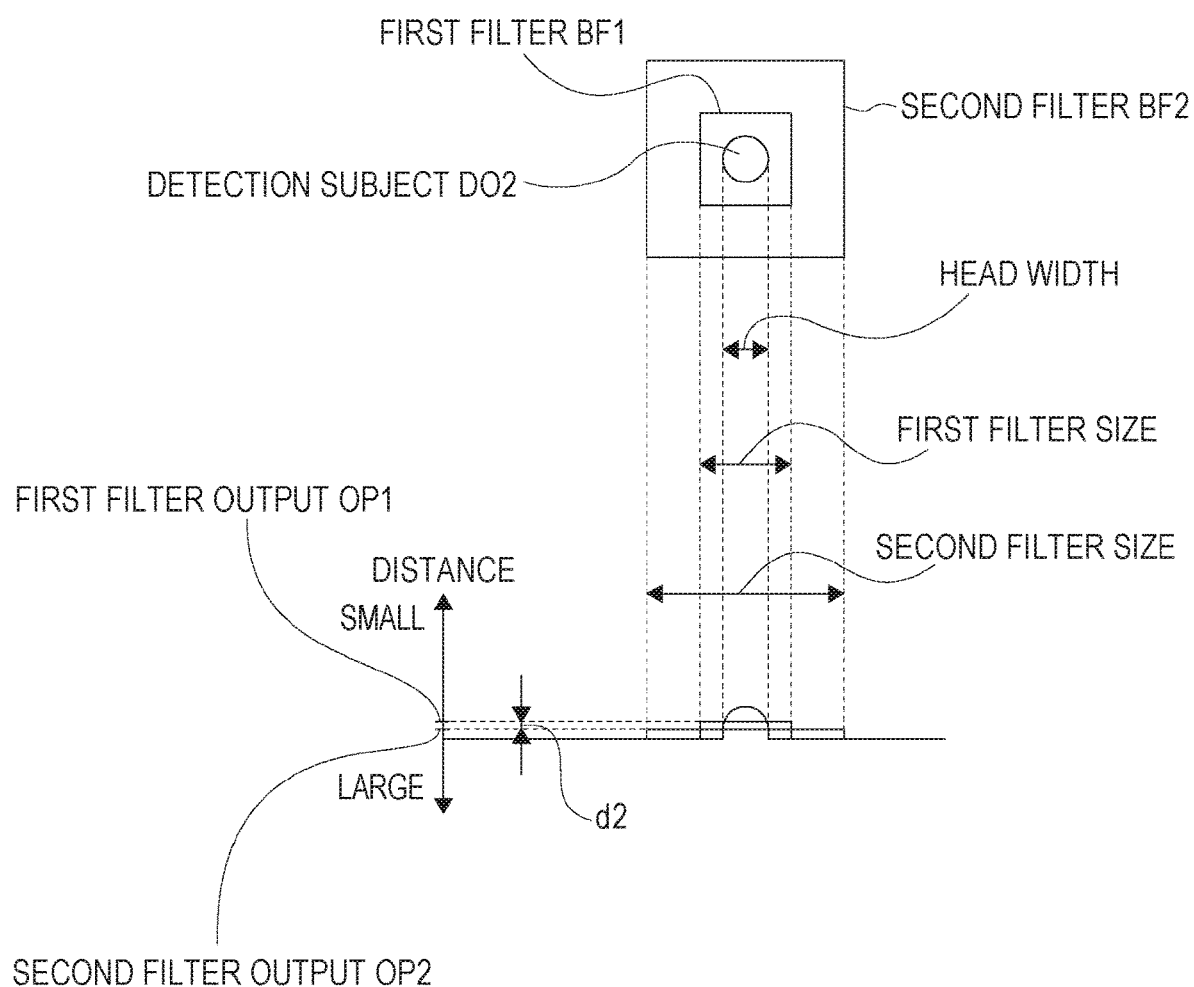
FIG. 8 is an explanatory diagram illustrating an example of similarity calculation for a subject smaller than a registered head size.
Figure 9:
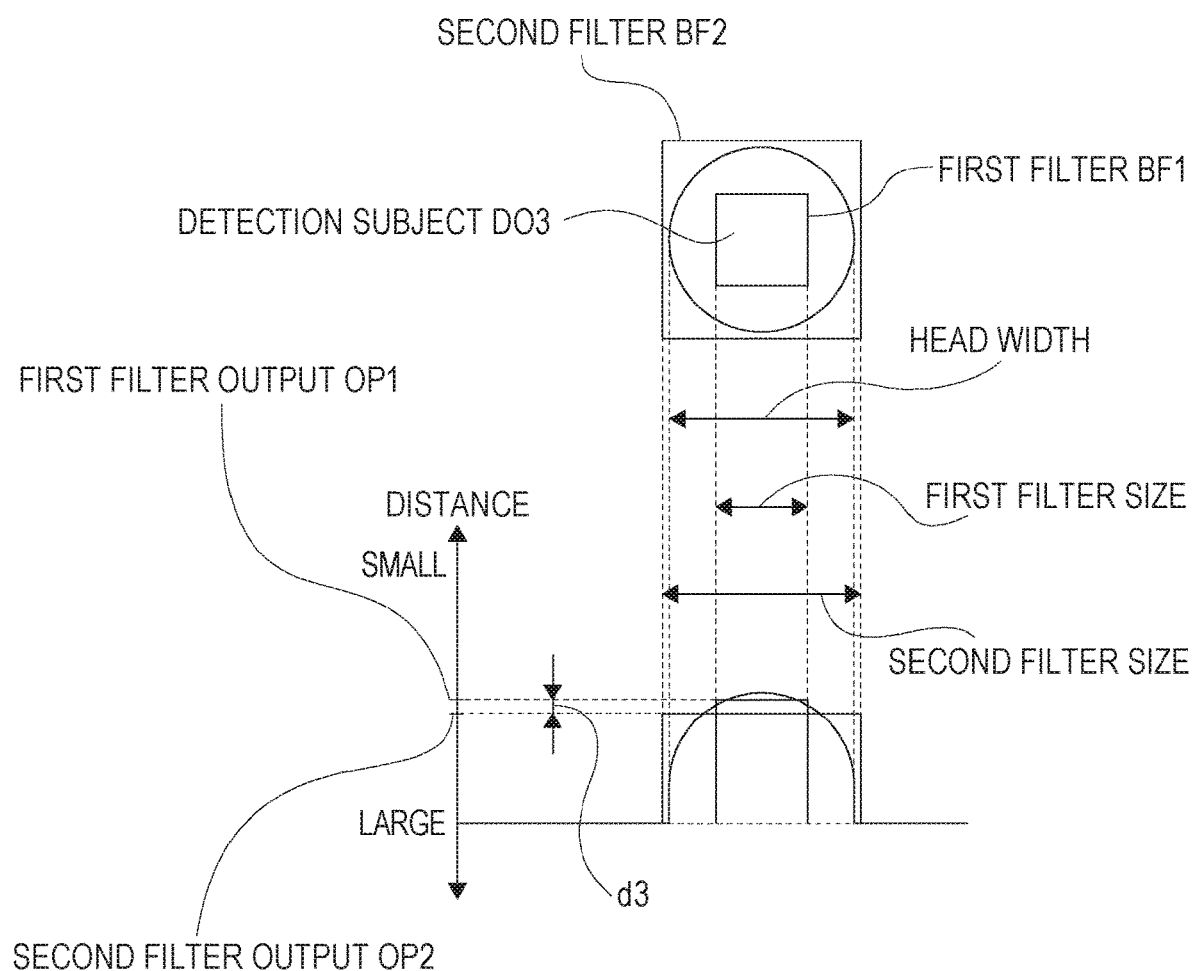
FIG. 9 is an explanatory diagram illustrating an example of similarity calculation for a subject larger than a registered head size.

Each of FIGS. 7, 8, and 9 illustrates detection subjects DO1, DO2, and DO3, a first filter BF1 and a second filter BF2 which are two types of box filters applied to each detection subject, and a first filter output OP1 and a second filter output OP2 which are application results of each box filter.

First, FIG. 7 will be described. The first filter BF1 is a box filter having the same size as the registered head size. The first filter BF1 is a filter that has the same size as the verification area and is applied to the verification area. Furthermore, the second filter BF2 is a box filter having a larger size than the first filter BF1. The second filter BF2 is a filter applied to an area wider than the verification area with the verification area as the center.

The detection subject DO1 is a detection subject having substantially the same size as the registered head size. That is, the image area of the detection subject DO1 has a horizontal width and a vertical width substantially equal to those of the first filter BF1.

In the lower part of FIG. 7, a graph illustrating the relationship between the distance value of the distance image in the horizontal direction and the output value of each box filter is presented.

As illustrated in the graph of FIG. 7, the distance to the subject is indicated as a large value for the background portion, and the distance for each pixel based on the shape of the head is indicated for the head area (area of the first filter BF1).

Furthermore, the first filter output OP1 is an average value of the distances of the filter area. That is, since most of the filter area of the first filter BF1 is set as the image area of the detection subject, the first filter output OP1 has a small value.

Meanwhile, in the output of the second filter output OP2, a part of the filter area is set as the image area of the detection subject, and the other part is set as the background area.

Since the distance of the background area is a large value, the second filter output OP2 is made larger than the first filter output OP1.

The magnitude of the difference d1 between the first filter output OP1 and the second filter output OP2 is regarded as similarity. That is, as the difference between the first filter output OP1 and the second filter output OP2 is larger, the size of the first filter BF1 and the size of the detection subject match. In other words, the size of the detection subject matches the stored head size.

Here, how the similarity changes in a case where the first filter BF1 and the second filter BF2 are applied to the detection subject DO2 smaller than the filter area of the first filter BF1 and the detection subject DO3 larger than the filter area of the first filter BF1 will be described.

FIG. 8 is a diagram for explaining the similarity for the detection subject DO2 smaller than the filter area of the first filter BF1.

As illustrated, since the proportion of the image area of the detection subject DO2 in the filter area (=verification area) of the first filter BF1 is reduced, the first filter output OP1 has a larger value than that illustrated in FIG. 7.

As a result, the difference d2 (=similarity) between the first filter output OP1 and the second filter output OP2 is smaller than the difference d1 in FIG. 7.

FIG. 9 is a diagram for explaining the similarity of the detection subject DO3 larger than the filter area of the first filter BF1.

As illustrated, since the proportion of the image area of the detection subject DO2 in the filter area of the first filter BF1 is increased, the first filter output OP1 has a value slightly larger than that illustrated in FIG. 7.

Meanwhile, since the proportion of the image area of the detection subject DO3 in the filter area of the second filter BF2 is also increased, the second filter output OP2 has a larger value than that in FIG. 7.

As a result, the difference d3 (=similarity) between the first filter output OP1 and the second filter output OP2 is smaller than the difference d1 in FIG. 7.

As illustrated in each of FIGS. 7 to 9, in a case where the filter size of the first filter BF1 and the size of the detection subject substantially match, the similarity has a large value.

In this way, the scanning/determination processing unit 35 calculates the similarity in order to determine whether or not the size of the detection subject is similar to the stored head size.

In addition, the scanning/determination processing unit 35 determines whether or not the shape of the detection subject is similar to the shape of the head (subject to be detected) of the user who is set as the specific subject using the edge image obtained from the low-resolution distance image.

This will be specifically described with reference to the accompanying drawings.

The scanning/determination processing unit 35 generates an edge image from a low-resolution corrected distance image. In the generation of the edge image, edge detection processing in two directions of the horizontal direction and the vertical direction is executed.

First, setting of a pixel area to be an edge detection target will be described with reference to FIG. 10.

With respect to a reference frame BC having the same size as the stored head size, an auxiliary frame AUC1 slightly smaller on the inner side and an auxiliary frame AUC2 slightly larger on the outer side are set, and an area between the auxiliary frame AUC1 and the auxiliary frame AUC2 is set as an edge detection target area AR0. The size of the reference frame BC is the same as the size of the verification area described above.

Figure 10:
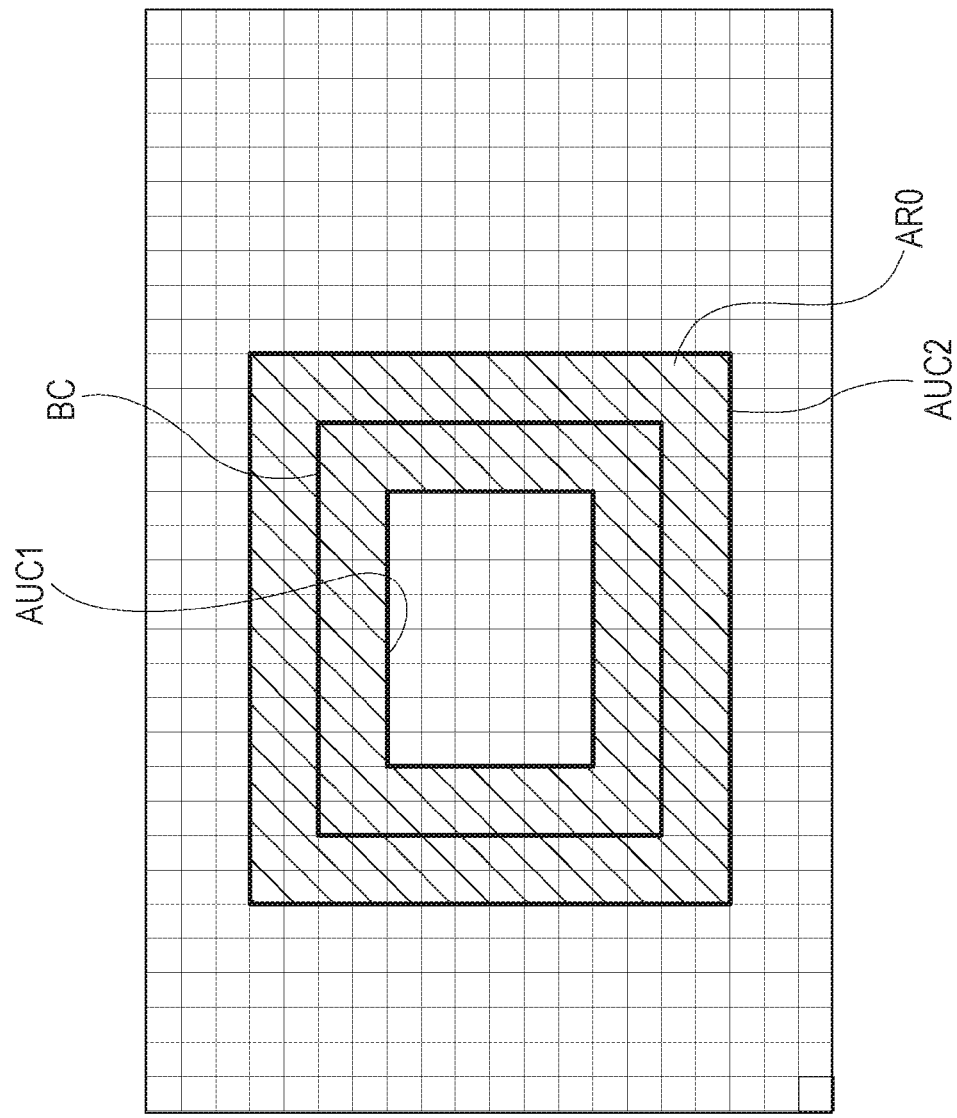
FIG. 10 is an example of a pixel area as an edge detection target.

In the example illustrated in FIG. 10, the auxiliary frame AUC1 is a frame on the inner side of two pixels with respect to the reference frame BC, and the auxiliary frame AUC2 is a frame on the outer side of two pixels with respect to the reference frame BC.

Figure 11:
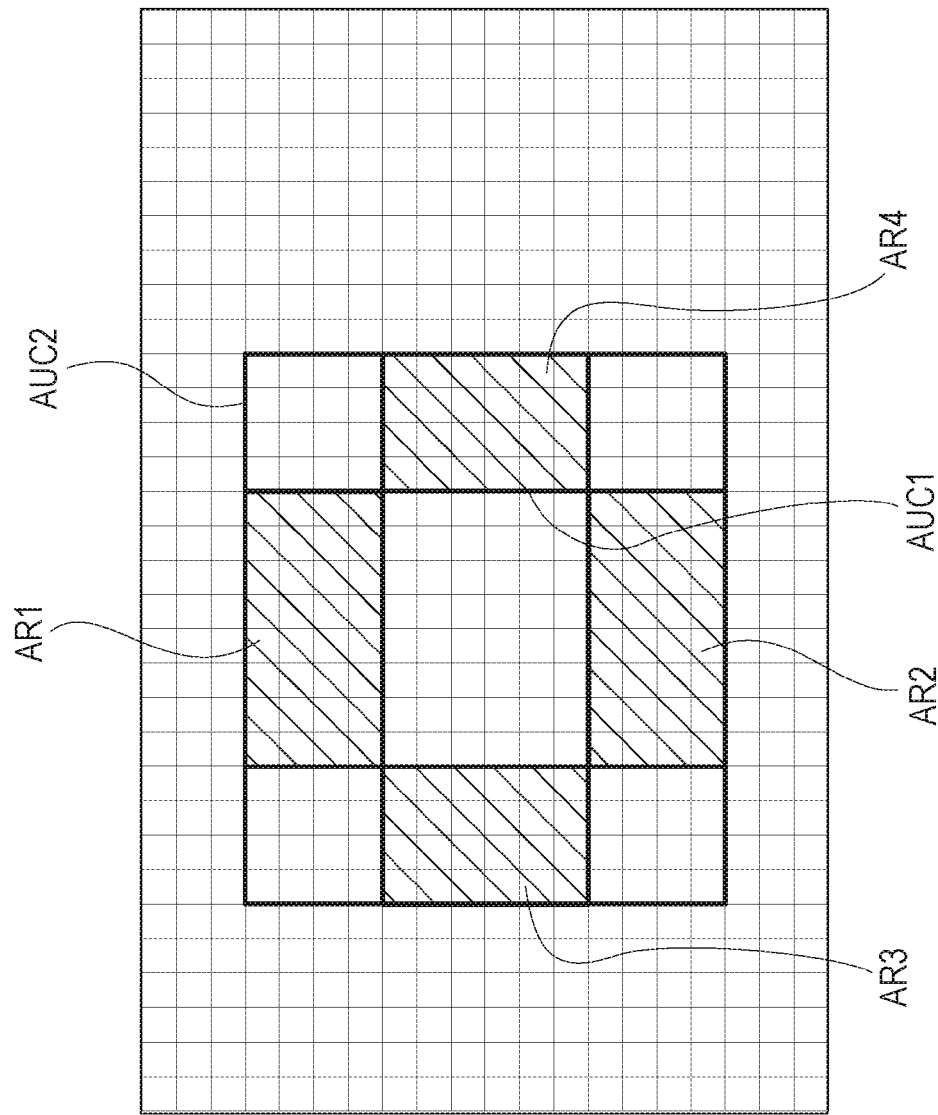
FIG. 11 is an example of an edge search range.

Next, edge detection is performed on a part of the edge detection target area AR0. Specifically, as illustrated in FIG. 11, an area above the auxiliary frame AUC1 is set as an edge search range AR1, an area below the auxiliary frame AUC1 is set as an edge search range AR2, a left area of the auxiliary frame AUC1 is set as an edge search range AR3, and a right area of the auxiliary frame AUC1 is set as an edge search range AR4.

Figure 12:
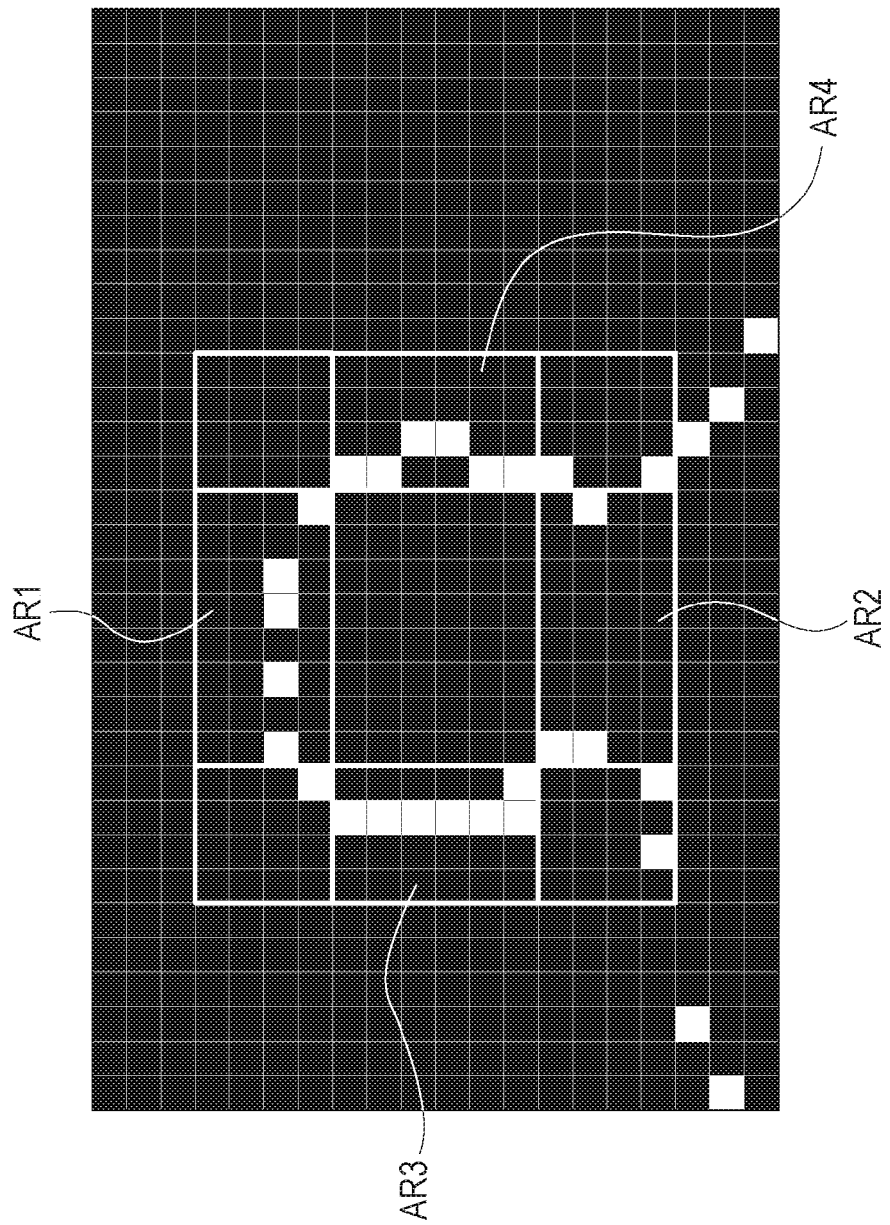
FIG. 12 is an example of an application result of edge detection processing.

For the edge search range AR1 and the edge search range AR2, horizontal edges are detected. Furthermore, for the edge search range AR3 and the edge search range AR4, vertical edges are detected. FIG. 12 illustrates an example of an application result of the edge detection processing in each edge search range.

As illustrated, the number of pixels (hereinafter, described as "edge pixels") detected as edges in the edge search range AR1 is five, the number of edge pixels in the edge search range AR2 is three, the number of edge pixels in the edge search range AR3 is seven, and the number of edge pixels in the edge search range AR4 is six.

In a case where the number of edge pixels detected in the edge search range is equal to or larger than a predetermined number, it is determined as an area in which a contour is detected. Then, in a case where a contour is detected in three edge search ranges among the four edge search ranges, it is determined that a human head-like object is detected.

At this time, the threshold used to detect the contour is different for each edge search range. Specifically, a value obtained by multiplying the number of pixels in the edge detection direction by 0.5 is set as the threshold.

For example, in the case of the edge search range AR1 and the edge search range AR2, since the edge detection in the horizontal direction is performed, four obtained by multiplying the number of pixels in the horizontal direction (=8) by 0.5 is set as the threshold.

Furthermore, in the case of the edge search range AR3 and the edge search range AR4, since the edge detection in the vertical direction is performed, three obtained by multiplying the number of pixels in the vertical direction (=6) by 0.5 is set as the threshold.

When it is determined whether or not a contour has been detected using a threshold for each edge search range, it is determined that a contour has been detected for the edge search range AR1. Similarly, it is determined that no contour is detected in the edge search range AR2. Furthermore, it is determined that a contour is detected in the edge search range AR3 and the edge search range AR4.

That is, it is determined that the contour is detected in three edge search ranges of the edge search range AR1, the edge search range AR3, and the edge search range AR4. As described above, in a case of detecting a human head, in a case where it is determined that the contour has been detected in three edge search ranges among the four edge search ranges, it is determined that the shape of the detection subject is similar to the shape of the head of the user who is set as the specific subject.

As described above, in the scanning/determination processing unit 35 illustrated in FIG. 3, the above-described processing is performed in order to determine whether or not the size and shape of the detection subject are similar to those of the specific subject. Then, the scanning/determination processing unit 35 determines whether or not to execute the detailed detection processing (identification processing such as face authentication processing) of the subsequent stage according to the size similarity and whether or not the shapes are similar. In other words, the scanning/determination processing unit 35 performs determination processing of determining whether or not the detection subject is a processing target subject of the identification processing.

The scanning/determination processing unit 35 outputs result information to the imaging device control unit 5 of the subsequent stage. As the result information, for example, not only a determination result as to whether or not to execute the identification processing but also information for specifying an image area in which the processing target subject is detected is output.

In the identification processing as the detailed detection processing in the subsequent stage, since the image recognition processing or the like for the high-resolution image is executed, there is a possibility that the power consumption becomes excessively large. However, the information for specifying the image area in which the processing target subject is detected is output from the scanning/determination processing unit 35, so that the image area to be processed can be limited in the identification processing in the subsequent stage, and the processing load of the detailed detection processing and the power consumption can be reduced.

In the identification processing, various types of image recognition processing can be applied. For example, a face authentication processing of determining whether or not a subject is a user who uses the imaging device 1 may be executed using a deep neural network (DNN), a convolutional neural network (CNN), or the like. Furthermore, in addition to the face authentication, other authentication means such as retina authentication may be used.

Such detailed detection processing may be executable by, for example, the identification processing unit 41 included in the imaging device control unit 5.

Figure 13:
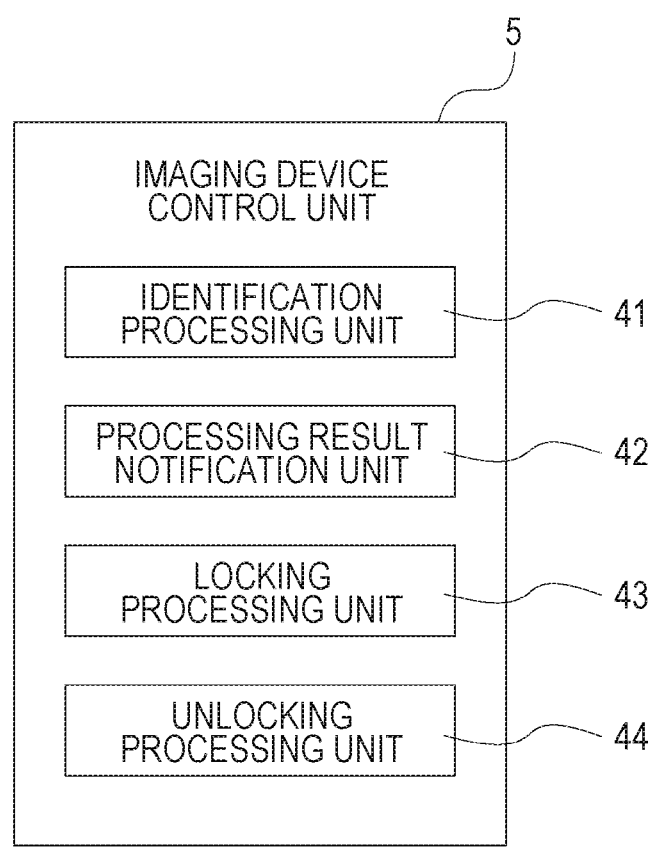
FIG. 13 is a block diagram illustrating a functional configuration example of an imaging device control unit.

For example, as illustrated in FIG. 13, the imaging device control unit 5 may include an identification processing unit 41, a processing result notification unit 42, a locking processing unit 43, an unlocking processing unit 44, and the like.

The identification processing unit 41 executes identification processing according to the result information output from the scanning/determination processing unit 35 of the signal processing unit 12. This will be specifically described later.

The processing result notification unit 42 notifies the user of the propriety of the unlocking by executing processing of displaying the processing result of the identification processing on, for example, the display unit of the imaging device 1.

The locking processing unit 43 executes processing of limiting various functions as processing of locking the imaging device 1. Specifically, locking processing for transition of the smartphone from the sleep state to the activation state is performed.

The unlocking processing unit 44 performs processing of unlocking various functions locked by the locking processing unit 43. Specifically, by performing unlocking processing in the smartphone, the smartphone is transitioned from the sleep state to the activation state. The unlocking processing is executed according to the result of the identification processing by the identification processing unit 41.

<3. VARIOUS PROCESSING>

An example of processing executed by each processing unit such as the signal processing unit 12 and the imaging device control unit 5 of the imaging device 1 will be described with reference to the accompanying drawings.

<3-1. Overall Processing>

Various types of processing executed from when the user performs an operation of unlocking the imaging device 1 to when the lock is released will be described with reference to FIG. 14.

The signal processing unit 12 of the imaging device 1 executes the head detection processing in step S101. The head detection processing is processing of detecting a head-like object on the basis of a low-resolution distance image. The head detection processing is executed, for example, at regular time intervals.

By executing the head detection processing in step S101, the signal processing unit 12 can obtain a processing result as to whether or not a head-like object has been detected. Then, the signal processing unit 12 sets the processing result of the head detection processing as a head detection flag.

Subsequently, in step S102, the signal processing unit 12 performs branching processing based on whether the head detection flag is ON or OFF.

In a case where the head detection flag is set to ON, that is, in a case where a head-like object is detected, the imaging device control unit 5 performs high-resolution image preparation processing in step S103. This processing is preparation processing for executing the above-described detailed detection processing using a high-resolution image.

After finishing the preparation of the high-resolution image, the imaging device control unit 5 performs identification processing as detailed detection processing in step S104. With this processing, it is determined whether or not the head-like subject detected in step S101 is the head of the user of the imaging device 1.

Figure 14:
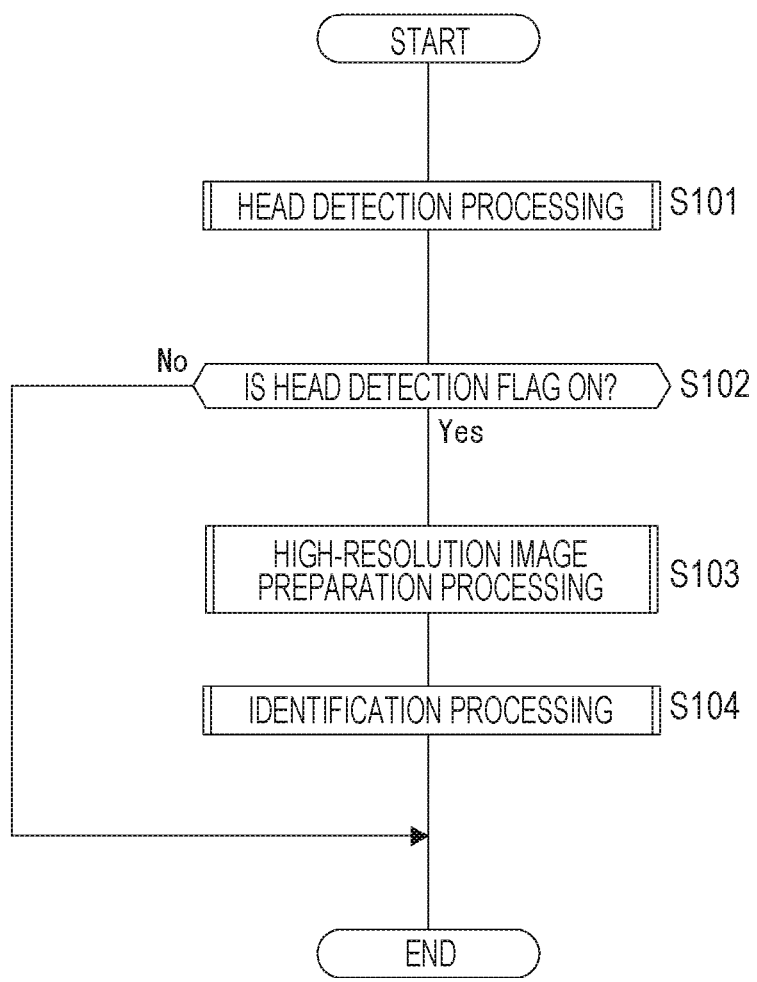
FIG. 14 is a flowchart illustrating an overall processing flow.

Then, in a case where it is determined that the head-like subject detected in step S101 matches the user's head, unlocking processing or the like is executed by a process not illustrated in FIG. 14.

<3-2. Head Detection Processing>

Figure 15:
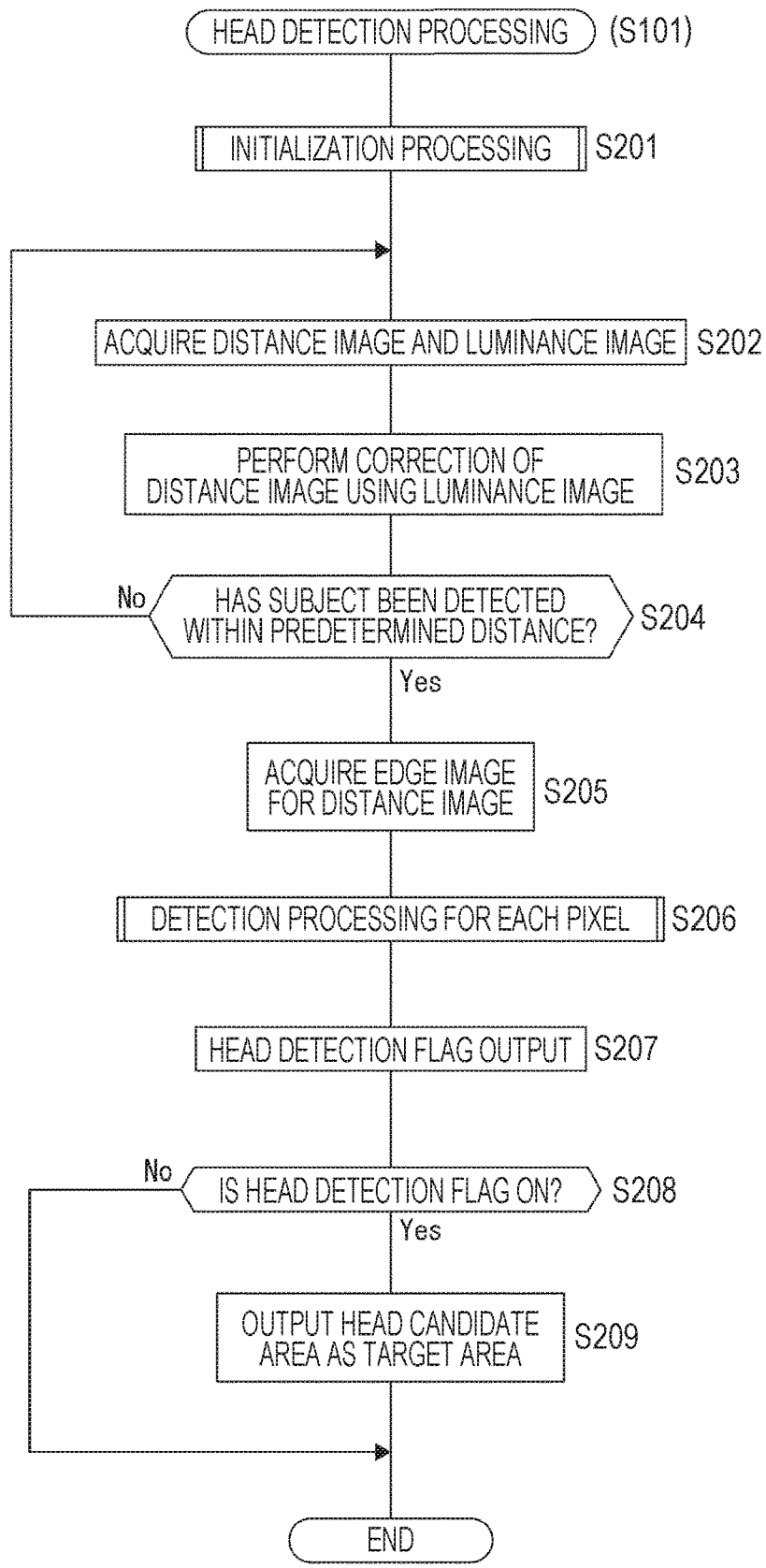
FIG. 15 is a flowchart illustrating an example of head detection processing.

FIG. 15 illustrates a specific processing flow of the head detection processing illustrated in step S101 of FIG. 14.

In step S201, the signal processing unit 12 executes initialization processing.

Figure 16:
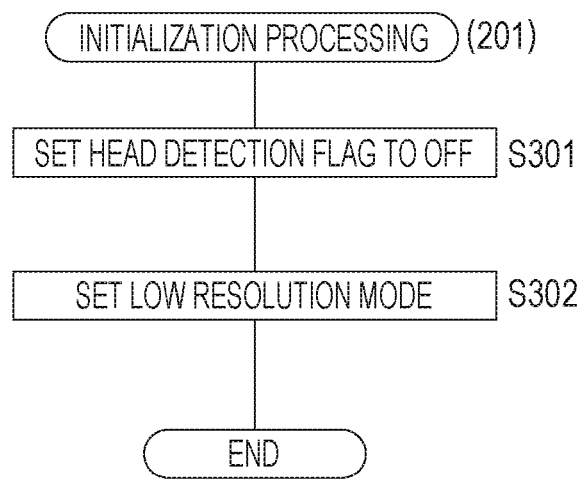
FIG. 16 is a flowchart illustrating an example of initialization processing.

An example of the initialization processing is illustrated in FIG. 16.

In the initialization processing, the signal processing unit 12 first sets the head detection flag to OFF in step S301.

Next, in step S302, the signal processing unit 12 sets the low resolution mode. This is because a low-resolution distance image or a luminance image is used for the head detection processing.

After setting the low resolution mode, the signal processing unit 12 ends the initialization processing in step S201.

The description returns to FIG. 15.

In step S202, the signal processing unit 12 acquires a low-resolution distance image and a luminance image. In order to acquire the distance image and the luminance image, timing control of the IR light emitting unit 6 and the IR light receiving unit 11 is performed via the distance measuring module control unit 9.

In step S203, the signal processing unit 12 performs correction of the distance image using the luminance image. This processing refers to the correction processing described above.

Subsequently, in step S204, the signal processing unit 12 determines whether or not a subject has been detected within a predetermined distance. In this processing, it is simply determined whether or not a subject located within a predetermined distance from the imaging device 1 is present without performing determination processing such as whether or not the subject is a head-like object.

In a case where a subject is not detected within the predetermined distance (for example, within 50 cm), the signal processing unit 12 returns to step S202 and acquires the low-resolution distance image and the luminance image again. That is, the processing from step S202 to step S204 is executed at regular time intervals.

Meanwhile, in a case where it is determined in step S204 that a subject has been detected within the predetermined distance, the signal processing unit 12 proceeds to step S205 and acquires the edge image for the distance image.

The edge image acquired here is an edge image obtained by performing edge detection in the horizontal direction and the vertical direction in the entire pixel area of the distance image.

Next, in step S206, the signal processing unit 12 performs detection processing for each pixel. In the detection processing for each pixel, each pixel is selected by sequentially shifting the processing target pixel in the column direction and the row direction, and various types of processing are applied to the selected pixel. Specifically, processing of calculating the similarity in size of the subject by applying the above-described two box filters with the selected pixel as the center, processing of determining whether or not the shape of the subject is similar to the head shape of the user who is set as the specific subject using the edge image, and the like are executed.

Figure 17:
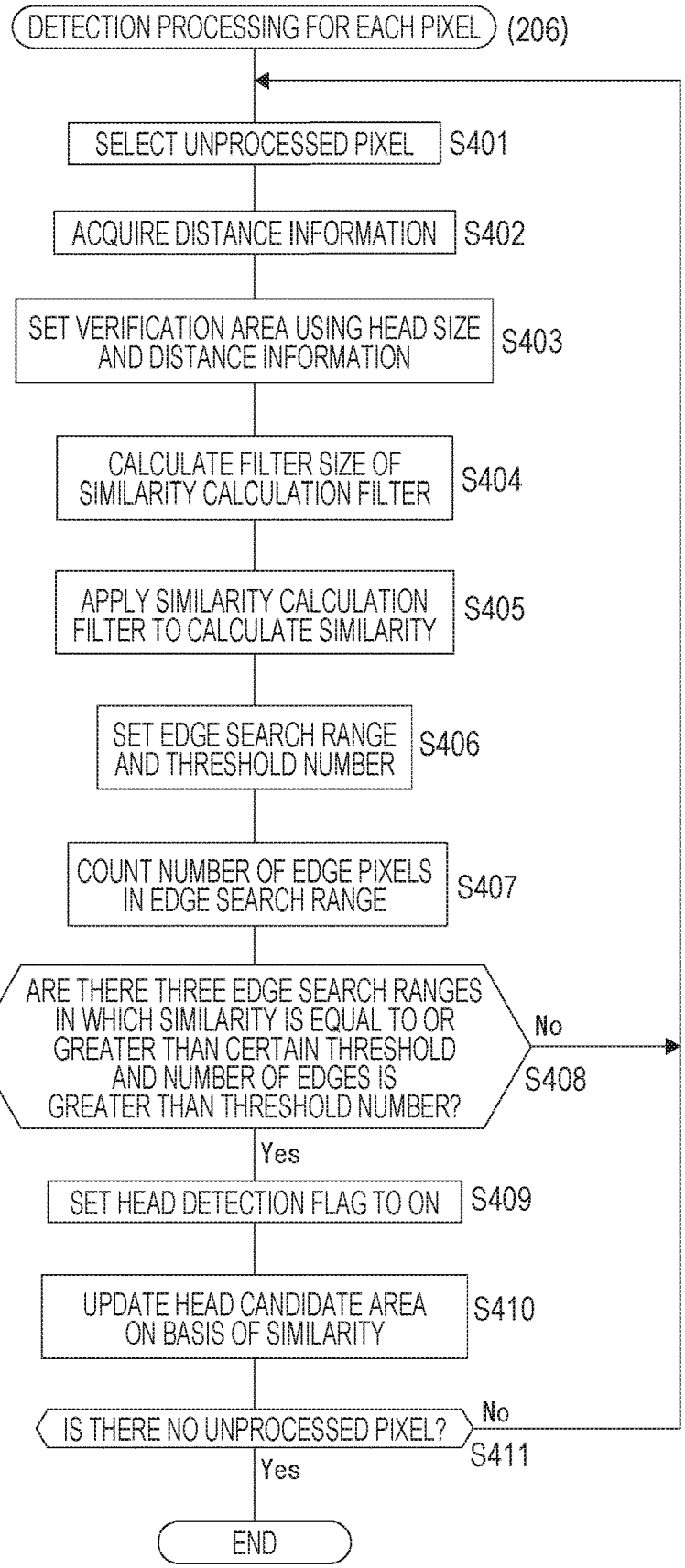
FIG. 17 is a flowchart illustrating an example of detection processing for each pixel.

FIG. 17 illustrates a specific example of the detection processing for each pixel in step S206.

In step S401, the signal processing unit 12 selects an unselected pixel. By repeatedly executing step S401, unselected pixels are sequentially selected, and each processing in and after step S402 is applied. Therefore, each processing after step S402 can be applied to all the pixels in the acquired distance image.

Note that pixels arranged in the vicinity of the outer edge portion in the low-resolution distance image may be excluded from the selection target. This is because there is a high possibility that an appropriate result cannot be obtained even if the above-described application of the box filter or specification of the shape using the edge image is executed with the pixel near the outer edge portion at the center. Furthermore, in the detailed detection processing in the subsequent stage, there is a possibility that appropriate identification processing cannot be executed for pixels near the outer edge portion.

In step S402, the signal processing unit 12 acquires distance information. The distance information to be acquired is distance information for the pixel selected in step S401.

Next, in step S403, the signal processing unit 12 sets the verification area using the head size and the distance information. The proportion of the subject in the image, that is, the size of the subject in the image changes according to the distance from the imaging device to the subject. The size of the subject in the image can be calculated if the size of the subject (head size) and distance information are known. Here, on the basis of the stored head size and the distance information regarding the detected subject, an area that would be occupied in the image if the subject is a detection target head is set as the verification area. Note that the center of the verification area is the pixel selected in step S401.

In step S404, the signal processing unit 12 calculates the filter size of the similarity calculation filter. The similarity calculation filter is the first filter BF1 and the second filter BF2 described above. As described above, the first filter BF1 is a box filter having the same size as the verification area.

In step S405, the signal processing unit 12 applies the similarity calculation filter to the verification area to calculate the similarity.

In step S406, the signal processing unit 12 sets the edge search range and the threshold number (see FIG. 12).

In step S407, the signal processing unit 12 counts the number of edge pixels for each edge search range.

In step S408, the signal processing unit 12 determines whether or not there are three edge search ranges in which the similarity is equal to or greater than a certain value and the number of edges is greater than the threshold number.

For example, in the state illustrated in FIG. 7, it is determined that the similarity is equal to or greater than a certain level. Furthermore, in the state illustrated in FIG. 12, it is determined that there are three edge search ranges in which the number of edges is greater than the threshold number.

In a case where both of the two conditions illustrated in step S408 are satisfied, the signal processing unit 12 sets the head detection flag to ON in step S409. This means that a head-like object has been detected in the verification area.

After finishing the processing of step S409, the signal processing unit 12 updates the head candidate area on the basis of the similarity in step S410. For example, the series of processing from step S402 to step S408 is executed a plurality of times while changing the processing target pixel. In the process, there is a case where a head-like subject is detected a plurality of times, that is, there is a case where a head-like subject is detected in a plurality of different verification areas. In this case, the processing of selecting the verification area having the highest similarity as the head candidate area is executed in step S410.

After finishing the processing of step S410, the signal processing unit 12 determines the presence or absence of an unprocessed pixel in the distance image in step S411. In a case where there is an unprocessed pixel, the process returns to step S401 to select an unprocessed pixel, and then each processing of steps S402 to S411 illustrated in FIG. 17 is executed again.

Meanwhile, in a case where there is no unprocessed pixel, that is, in a case where the respective processing from step S402 to step S410 illustrated in FIG. 17 have been executed for all the pixels, the signal processing unit 12 ends the detection processing for each pixel illustrated in FIG. 17.

In a case where at least one of the two determination conditions illustrated in step S408 is not satisfied, the signal processing unit 12 proceeds to the processing of step S401 and selects a next pixel.

The description returns to FIG. 15.

In step S207, the signal processing unit 12 outputs the head detection flag to the imaging device control unit 5 of the subsequent stage.

Then, the signal processing unit 12 appropriately outputs the detected area as a target area. Specifically, in step S208, the signal processing unit 12 determines whether or not the head detection flag is set to ON.

In a case where it is determined that the head detection flag is ON, in step S209, the signal processing unit 12 outputs an area where a head-like subject is detected as a target area to the imaging device control unit 5.

Therefore, in the identification processing in step S104 in FIG. 14, the imaging device control unit 5 only needs to perform processing for a partial area, that is, only a target area.

Meanwhile, in a case where it is determined in step S208 that OFF is set to the head detection flag, the signal processing unit 12 ends the head detection processing illustrated in FIG. 15 without executing the processing of step S209. In this case, the imaging device control unit 5 does not execute the processing of preparing a high-resolution image (processing of step S103) or the identification processing (processing of step S104).

That is, the identification processing using the high-resolution image in the subsequent stage is only required to be executed only in a case where a human head-like subject is detected in the head detection processing as the simple detection processing.

<3-3. High-Resolution Image Preparation Processing>

The high-resolution image preparation processing is processing of preparing a high-resolution image to be used for identification processing of determining whether or not the face (head) of the processing target subject matches the face (head) of the user (=registered user) of the imaging device 1 or the like. This will be specifically described with reference to FIG. 18.

In step S501, the imaging device control unit 5 acquires information for specifying a target area that is an area to which the identification processing is applied. The target area is an area on the low-resolution distance image.

Next, in step S502, the imaging device control unit 5 calculates where the area corresponding to the target area in the low-resolution distance image is on the high-resolution distance image and the luminance image. The calculated area is set as a "corresponding area".

In step S503, the imaging device control unit 5 sets the high resolution mode. Therefore, a high-resolution distance image can be acquired from the ToF sensor via the distance measuring module control unit 9. Furthermore, the luminance image capturing unit 3 can also acquire a high-resolution luminance image.

In step S504, the imaging device control unit 5 acquires the high-resolution distance image and the high-resolution luminance image, and ends the high-resolution image preparation processing.

Note that, in a case where active light projection is performed when a high-resolution distance image and a luminance image are acquired, light projection limited to a partial area may be performed so that image data for the corresponding area can be acquired. Therefore, power consumption related to active light projection can be reduced.

Note that, in the configuration illustrated in FIG. 1, since the low-resolution distance image and the luminance image are not output from the ToF sensor 7 to the outside, security can be improved. Furthermore, security is also improved in that a high-resolution distance image is output to the outside of the ToF sensor 7 (imaging device control unit 5) only in a case where identification processing is required.

Figure 19:
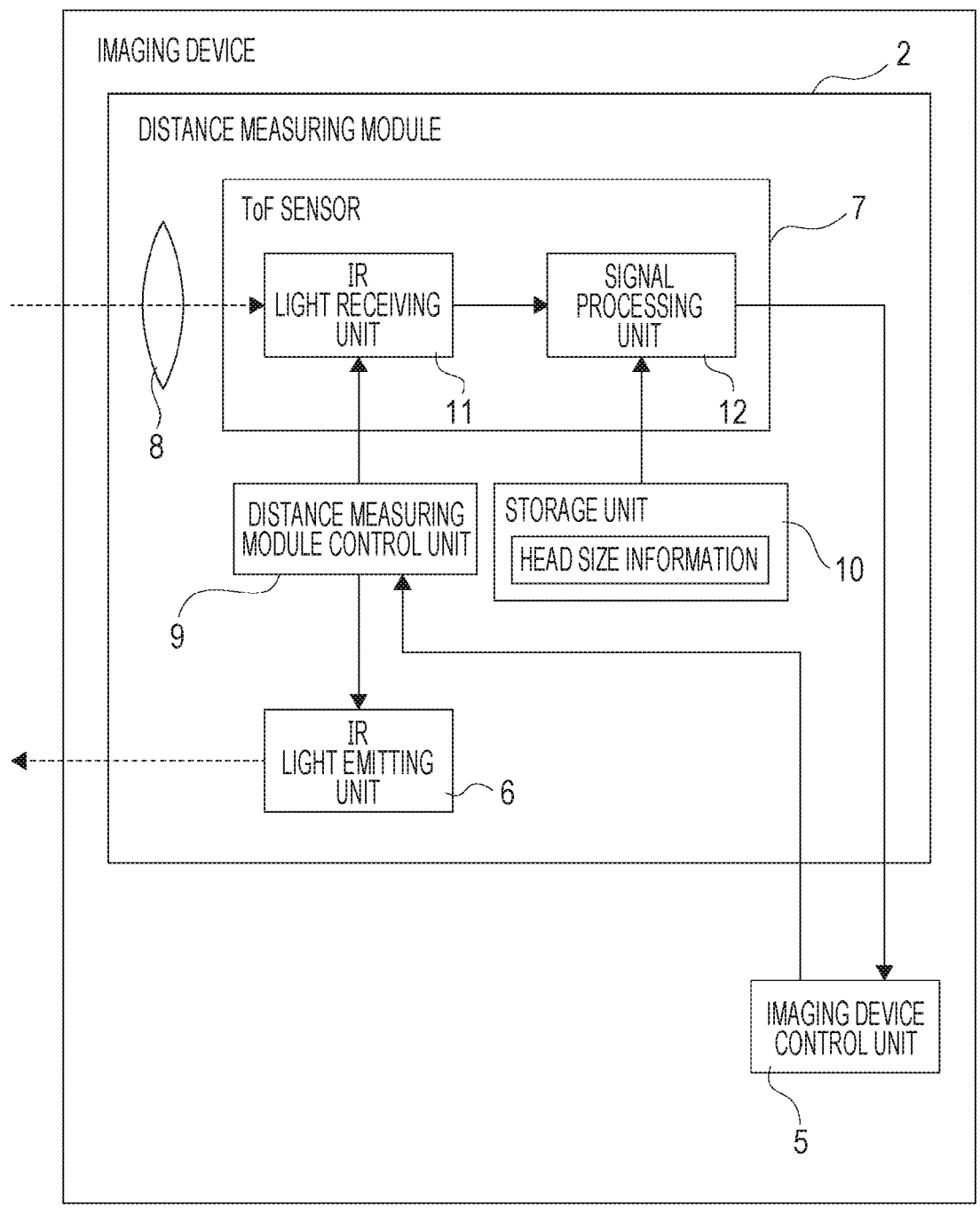
FIG. 19 is a block diagram illustrating another configuration example of the imaging device.

Note that, as a configuration other than the imaging device 1 illustrated in FIG. 1, the signal processing unit 12 of the ToF sensor 7 may be able to generate a high-resolution luminance image used for identification processing as detailed detection processing. In that case, as illustrated in FIG. 19, the imaging device 1 can be configured by omitting the luminance image capturing unit 3 and the first lens system 4. Therefore, since the high-resolution distance image and the luminance image are output from the ToF sensor 7 only in a case where the identification processing is executed, security can be further improved. Furthermore, in that case, instead of outputting the distance image and luminance image acquired by the ToF sensor 7 over the entire pixel area, it can be configured to output only the image information of the corresponding area to the imaging device control unit 5. Therefore, the output of the image information can be minimized, and the security can be improved.

<3-4. Identification Processing>

Various identification processing methods can be considered. An example thereof will be described with reference to FIG. 20.

In step S601, the imaging device control unit 5 sets a corresponding area on the high-resolution image. Specifically, the corresponding area on each high-resolution image is set by applying the corresponding area calculated in step S502 to the high-resolution distance image and the luminance image acquired in step S504.

In step S602, the imaging device control unit 5 executes the face authentication processing on the set corresponding area. In the face authentication processing, for example, the face authentication may be performed by irradiating the subject with the structured light to execute processing of comparing the recesses and protrusions of the subject with the registered information, the face authentication may be performed by performing matching processing of the template image and the luminance image, or the face authentication may be performed with high accuracy by combining these.

In step S603, the imaging device control unit 5 performs branching processing based on the success or failure of the face authentication.

In a case where it is determined that the face authentication has succeeded, the imaging device control unit 5 outputs a success flag in step S604.

Meanwhile, in a case where it is determined that the face authentication has failed, that is, in a case where it is determined that the subject in the corresponding area is not the face of the registered user, the imaging device control unit 5 outputs a failure flag in step S605.

The imaging device control unit 5 executes various types of processing in accordance with the success flag in step S604 and the failure flag in step S605. For example, in a case where the success flag is output, the imaging device control unit 5 performs processing of releasing the locked state of various functions of the imaging device 1.

Furthermore, in a case where the failure flag is output, processing of notifying the user of the output of the failure flag is executed.

<4. MODIFICATIONS>

Although the imaging device 1 described above includes the ToF sensor 7 in order to acquire the distance image, the distance image may be acquired by other methods. For example, the imaging device 1 may include a stereo image acquisition unit instead of the ToF sensor 7.

Furthermore, the ToF sensor 7 may include a storage unit 10. That is, the head size information may be stored in the ToF sensor 7.

In the above example, the face or head of the user is an example of the detection target, but the detection target may be other subjects.

For example, the palm of the user may be the detection target, the pupil may be the detection target, or the fingerprint of the fingertip or the like may be the detection target.

Furthermore, instead of application to the authentication processing, it is possible to configure such that detection of whether or not a target animal is included as a subject in the angle of view is performed as simple detection processing corresponding to the head detection processing, and detailed detection processing is performed in a case where a target animal-like subject is detected by the simple detection processing.

Alternatively, in a monitoring camera or the like, a human-like object may be detected by executing low-resolution simple detection processing at a normal time, and detailed detection processing using a high-resolution image may be executed in a case where a human-like object is detected. In this case, in a case where the subject is identified as a human in the detailed detection processing, a high-resolution video may be recorded.

Therefore, since the low-resolution simple detection processing is executed unless a human is detected, the amount of calculation is greatly reduced, and the power consumption can be greatly reduced. Furthermore, since a high-resolution video is recorded only in a case where a human is detected, the storage area can be effectively used. Furthermore, in a case where the imaging device 1 is adopted as a network camera or the like that transfers the video data stored in the storage area to an external device such as a server, the data amount of the video data is reduced, and thus the communication band can be effectively used.

Of course, the detection processing may be executed not only for humans but also for dogs, cats, and the like.

Various execution timings of the low-resolution simple detection processing can be considered. For example, since the amount of calculation is small and the power consumption is small, the operation may be constantly executed. Therefore, the simple detection processing and the detailed detection processing can be executed only by the user looking into the screen of the smartphone as the imaging device 1.

Furthermore, as another method, it is conceivable to execute simple detection processing by combining signals of motion sensors that detect a motion of a device such as an acceleration sensor or a gyro sensor. For example, in a case where a signal of such a motion sensor is analyzed and it is detected that the user picks up the imaging device 1, the simple detection processing may be started. Furthermore, in a case where the analysis of the signal of the motion sensor is continued and it is detected again that the imaging device 1 is placed on a desk or the like, the simple detection processing may be terminated. Therefore, the power consumption can be further reduced.

In the example described above, the simple detection processing and the detailed detection processing are performed using the distance image and the luminance image, but the simple detection processing and the detailed detection processing may be performed using only the distance image.

In this case, only the distance image is acquired in step S202 of FIG. 15, and the processing of step S203 is not executed. Furthermore, only the high-resolution distance image may be acquired in step S504 of FIG. 18, and the face authentication processing in step S602 of FIG. 20 may be performed using only the high-resolution distance image.

<5. SUMMARY>

The imaging device 1 as the signal processing device including the signal processing unit 12 described above includes a storage unit 10 that stores size information of a specific subject (for example, the face or head of the user of the imaging device 1), and a determination processing unit (the scanning/determination processing unit 35) that acquires a second image (the distance image illustrated in FIG. 4) as a distance image having a resolution lower than that of a first image used in identification processing of determining whether or not a subject is the specific subject, and performs determination of whether or not the subject in the second image is a processing target subject in the identification processing using the first image on the basis of size information of the subject in the second image and the size information of the specific subject.

The size of the image area of the specific subject within the angle of view of the second image can be estimated by using the size information of the specific subject and the distance information of the subject.

Therefore, it is possible to easily estimate whether or not the subject appearing within the angle of view is the processing target subject, that is, whether or not the subject is the specific subject. Then, it is possible to generate images with various resolutions by enlarging or reducing the images and to generate images while suppressing the variety of resolutions as compared with the case of searching for an area matching the face template in each image. Therefore, the amount of calculation in the matching processing using the face template can be greatly suppressed, and the power consumption can be greatly reduced.

Specifically, in a case where it is estimated whether or not the subject in the second image is a specific subject without using the size information of the specific subject, it is necessary to generate many types (for example, 30 types) of images having different resolutions by enlarging or reducing the second image and perform the matching processing. Meanwhile, in a case where similar processing is performed using the size information of the specific subject, it is possible to estimate whether or not the subject in the second image is the specific subject only by generating an image having a certain specific resolution or images having several types (for example, three types) of resolutions near the specific resolution.

In this way, a significant reduction in the amount of calculation and power consumption can be achieved.

Furthermore, in a case where the specific subject is a face, the size of the face varies depending on race, gender, and age. In a case where these differences in size are not taken into consideration, there is a problem that face detection accuracy decreases. Specifically, the size of the face is determined in advance in order to reduce the amount of calculation, and the detection processing is performed on the basis of the size. Therefore, in a case where the subject is different from the size of the face assumed due to race, age, or the like, the face detection accuracy decreases.

Furthermore, in order to allow a difference in size of the face of the subject, it is conceivable to perform multi-resolution detection processing by enlarging or reducing the acquired image data, but the amount of calculation increases and the power consumption increases.

However, according to the present configuration, since the identification processing is performed using the size information of the specific subject, the face detection accuracy can be improved.

Furthermore, since the simple detection processing is performed on the basis of the low-resolution distance image, the processing can be performed at high speed. Therefore, the execution timing of the detailed detection processing at the subsequent stage of the simple detection processing can be speeded up, and the time required until the face authentication can be shortened. Specifically, it is possible to shorten the time from when the user shows the face to the smartphone to when the lock is released.

As described in the flowchart of FIG. 15, the determination processing unit (scanning/determination processing unit 35) of the signal processing unit 12 may specify the image area of the processing target subject in the second image as the target area.

When the target area is specified, the identification processing in the subsequent stage may be performed only for the target area.

Therefore, the amount of calculation in the identification processing can be reduced, and the power consumption can be further reduced.

As described with reference to each of FIGS. 7 to 9, the determination processing unit (scanning/determination processing unit 35) of the signal processing unit 12 may determine whether or not the subject is the processing target subject on the basis of the similarity between the size of the specific subject and the size of the subject in the second image.

Therefore, it is possible to prevent a subject having a size different from that of the specific subject from being detected as the processing target subject.

Therefore, the number of executions of the identification processing at the subsequent stage can be reduced, and the power consumption can be reduced.

As described with reference to each of FIGS. 7 to 9, the similarity may be calculated using two box filters (first filter BF1 and second filter BF2).

The operation using the box filters can be performed with a constant amount of calculation.

Therefore, it is possible to avoid an increase in the amount of calculation related to the calculation of the similarity.

As described with reference to each of FIGS. 10 to 12, the determination processing unit (scanning/determination processing unit 35) of the signal processing unit 12 may determine the subject in the second image as the processing target subject in a case where the shape of the specific subject is similar to the shape of the subject in the second image.

Therefore, it is possible to prevent a subject having a shape significantly different from that of the specific subject from being detected as the processing target subject.

Therefore, the number of executions of the identification processing at the subsequent stage can be reduced, and the power consumption can be reduced.

As described with reference to each of FIGS. 10 to 12, the determination processing unit (scanning/determination processing unit 35) of the signal processing unit 12 may determine whether or not the shape of the specific subject is similar to the shape of the subject in the second image on the basis of the edge information (see FIG. 12) extracted from the second image.

By determining whether or not the shapes are similar on the basis of the edge information, a subject having a similar size to the specific subject and having a similar shape to the specific subject is determined as the processing target subject.

Therefore, since the identification processing of the subsequent stage is executed only in a case where a subject having a high possibility of being a specific subject is detected, the number of executions of the identification processing with high power consumption can be reduced.

As described with reference to FIG. 13, the identification processing unit 41 that performs identification processing may be provided.

As a result of executing each processing on the second image, it is determined whether or not to execute the identification processing. Then, in a case where execution of the identification processing is determined, the identification processing unit executes the identification processing.

Therefore, the number of executions of the identification processing can be reduced, and the power consumption can be reduced.

As described in FIG. 14 and the like, the identification processing unit 41 may perform the identification processing in a case where the determination processing unit (scanning/determination processing unit 35) determines that the subject in the second image is the processing target subject in the identification processing using the first image.

In a case where the subject appearing within the angle of view of the second image has a size different from that of the specific subject, it is not necessary to execute subsequent identification processing. Also in this respect, the processing load can be reduced.

Moreover, since the necessity of execution of the identification processing is determined using the second image having a resolution lower than that of the first image used for the identification processing, the amount of calculation is reduced as compared with the case of using the first image for both the simple detection processing and the detailed detection processing described above, and the power consumption can be reduced. Then, since the identification processing based on the high-resolution image data (first image data) at the subsequent stage is performed only in a case where it is recognized as necessary, the execution frequency of the identification processing can be suppressed, and the power consumption can be further reduced.

Figure 18:
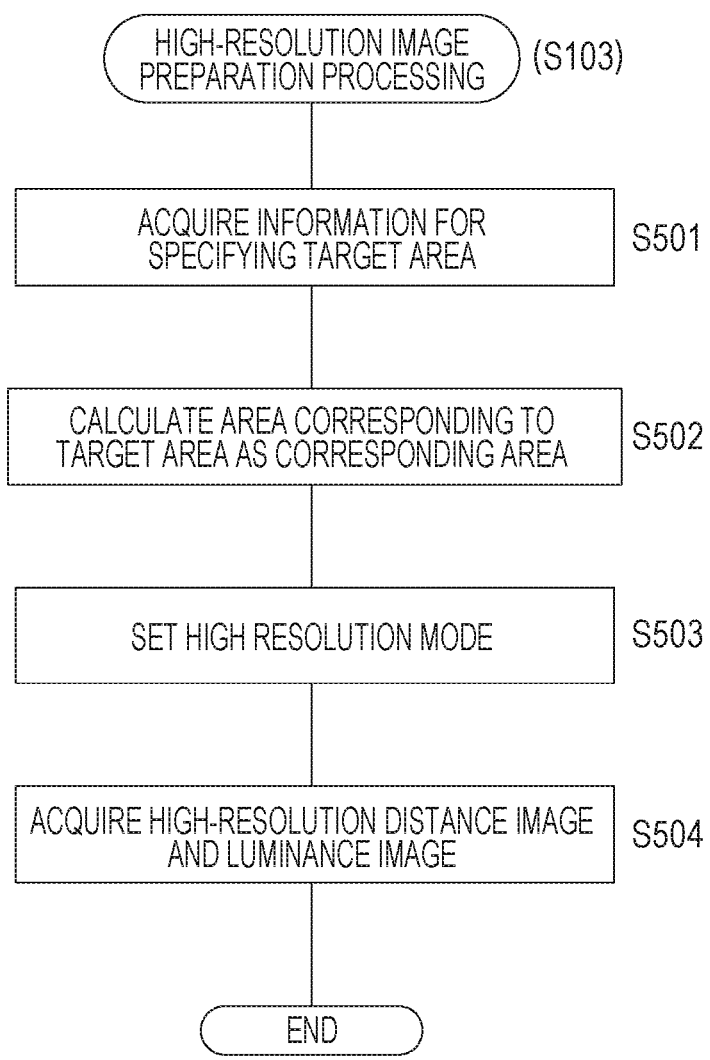
FIG. 18 is a flowchart illustrating an example of high-resolution image preparation processing.

As described with reference to FIG. 18 and the like, the determination processing unit (scanning/determination processing unit 35) of the imaging device control unit 5 may specify the image area of the processing target subject in the second image as the target area, and the identification processing unit 41 may specify the area corresponding to the target area in the area in the first image as the corresponding area.

By specifying the corresponding area, the identification processing can be executed for an appropriate area.

Therefore, the accuracy of the identification processing can be improved.

Figure 20:
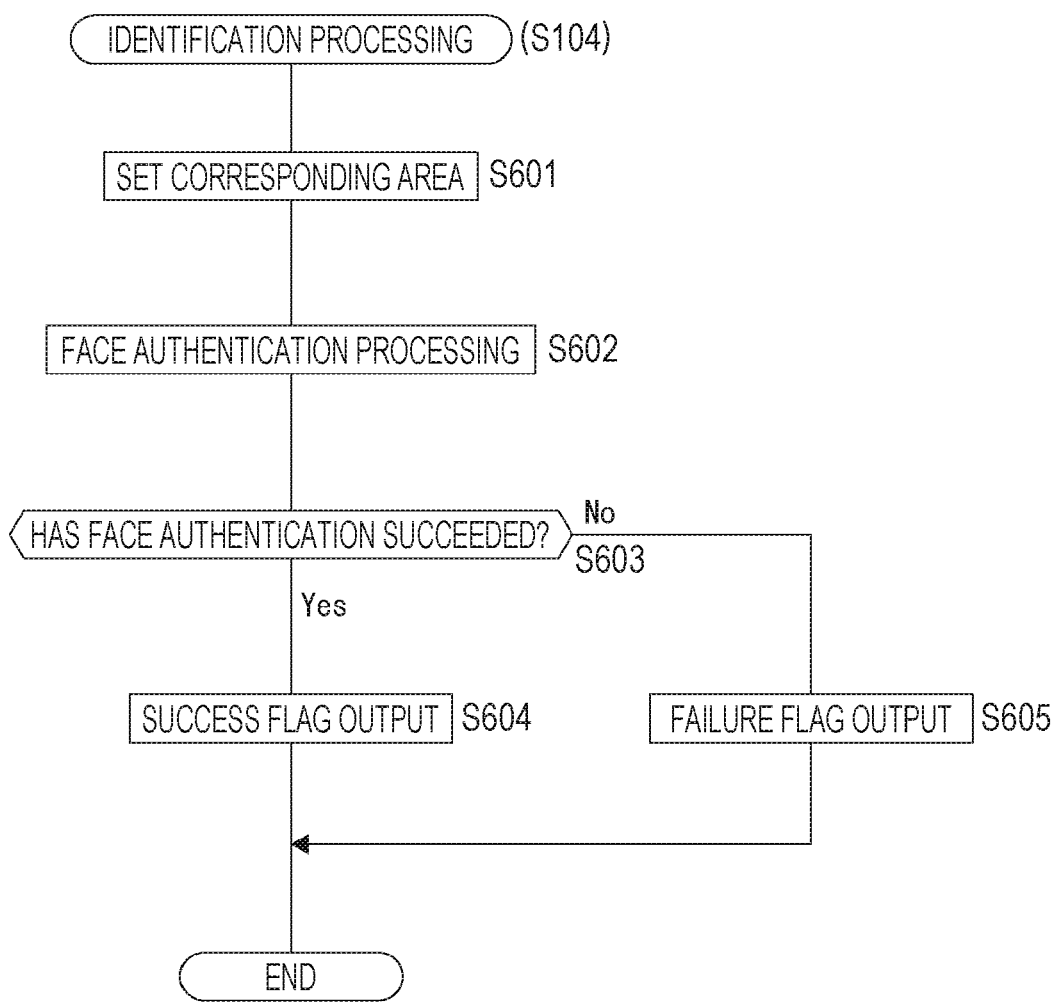
FIG. 20 is a flowchart illustrating an example of identification processing.

As described with reference to FIG. 20 and the like, the identification processing unit 41 of the imaging device control unit 5 may perform the identification processing on the corresponding area.

By performing the identification processing on the corresponding area, the amount of calculation of the identification processing is reduced.

Therefore, power consumption can be further reduced.

As described with reference to FIG. 20 and the like, the specific subject may be a specific person, and the identification processing unit 41 may perform processing of determining whether or not the subject in the second image is the same person as the specific person as the identification processing.

The processing of determining whether or not the subject in the second image is a specific person can be used in, for example, a face authentication system.

In the face authentication system or the like to which the present configuration is applied, by screening the processing target subject using the low-resolution second image before the identification processing using the high-resolution first image, the number of executions of the identification processing with high power consumption can be reduced, and power saving can be achieved.

As described in the modifications, the identification processing unit 41 of the imaging device control unit 5 may perform, as the identification processing, processing of determining whether or not the type of the subject in the second image is the same type as the type of the specific subject (for example, "person", "dog", "cat", and the like).

The processing of determining whether or not the type of the subject in the second image is the same as the type of the specific subject can be used, for example, in a case of searching for an image including a dog, in a case of searching for an image including a person, or the like.

By applying the present configuration in such search processing, the number of executions of identification processing with high power consumption can be reduced, and power saving can be achieved.

As described with reference to FIGS. 1, 19, and the like, the pixel array unit 21 in which photoelectric conversion elements are arranged in an array, the storage unit that stores size information of a specific subject (for example, the face or head of the user of the imaging device 1), and the determination processing unit (the scanning/determination processing unit 35) that acquires a second image (the distance image illustrated in FIG. 4) as a distance image having a resolution lower than that of a first image used in identification processing of determining whether or not a subject is the specific subject, and performs determination of whether or not the subject in the second image is a processing target subject in the identification processing using the first image on the basis of size information of the subject in the second image and the size information of the specific subject may be included.

With such an imaging device 1, the above-described various functions and effects can be obtained.

Furthermore, the pixel array unit 21 of such an imaging device 1 may output the second image.

Since the second image has a lower resolution than the first image, the number of times of reading in the pixel array unit 21 is reduced.

Therefore, a processing load and power consumption related to reading can be reduced.

The determination processing unit (scanning/determination processing unit 35) may make a determination using a corrected distance image (see FIG. 6) obtained by correcting the distance image on the basis of the luminance signal output from the pixel array unit 21.

For example, in a case where the light emitting unit emits infrared light, it is conceivable that the depth value is large for a pixel having a luminance value lower than a threshold.

In a case where the depth value for such a pixel is small, there is a possibility that the distance information for the pixel is incorrect. Therefore, processing of replacing the depth value is performed as the correction processing. Specifically, for example, it may be replaced with a value determined that an object is not close, that is, a value larger than a threshold used for proximity determination, or may be replaced with a value (for example, a null value or the like) indicating that the object is not a target of proximity determination.

Therefore, it is possible to increase the possibility that the area where the close object is imaged is appropriately specified.

As described with reference to FIGS. 1 and 19, the determination processing unit (scanning/determination processing unit 35) may be provided in the same sensor chip as the pixel array unit 21.

The processing of determining whether or not the subject in the second image is a processing target subject is performed as preprocessing of the identification processing, and as a result, in a case where it is determined that the subject is the processing target subject, subsequent identification processing is executed. That is, in a case where it is determined that the subject is not the processing target subject, the information of the second image used for the processing and the like are not transmitted to the outside of the sensor chip.

Therefore, since the amount of information transmitted outside the sensor chip and the transmission frequency can be reduced, the opportunity of information leakage can be reduced, and the security can be improved.

Note that the effects described in the present specification are merely examples and are not limited, and other effects may be provided.

<6. PRESENT TECHNOLOGY>

The present technology can also adopt the following configurations.

(1)

A signal processing device including:
a storage unit that stores size information of a specific subject; and
a determination processing unit that acquires a second image as a distance image having a resolution lower than that of a first image used in identification processing of determining whether or not a subject is the specific subject, and performs determination of whether or not the subject in the second image is a processing target subject in the identification processing using the first image on the basis of size information of the subject in the second image and the size information of the specific subject.

(2)

The signal processing device according to (1),
in which the determination processing unit specifies an image area of the processing target subject in the second image as a target area.

(3)

The signal processing device according to any one of (1) to (2),
in which the determination processing unit determines whether or not the subject is the processing target subject on the basis of similarity between a size of the specific subject and a size of the subject in the second image.

(4)

The signal processing device according to (3),
in which the similarity is calculated using two box filters.

(5)

The signal processing device according to any one of (3) to (4),
in which in a case where a shape of the specific subject is similar to a shape of the subject in the second image, the determination processing unit determines the subject in the second image as the processing target subject.

(6)

The signal processing device according to (5),
in which the determination processing unit determines whether or not the shape of the specific subject is similar to the shape of the subject in the second image on the basis of edge information extracted from the second image.

(7)

The signal processing device according to (1), further including
an identification processing unit that performs the identification processing.

(8)

The signal processing device according to (7),
in which the identification processing unit performs the identification processing in a case where the determination processing unit determines that the subject in the second image is the processing target subject in the identification processing using the first image.

(9)

The signal processing device according to any one of (7) to (8),
in which the determination processing unit specifies an image area of the processing target subject in the second image as a target area, and
the identification processing unit specifies a corresponding area of the first image corresponding to the target area in the second image.

(10)

The signal processing device according to (9),
in which the identification processing unit performs the identification processing on the corresponding area in the first image as a target.

(11)
The signal processing device according to any one of (7) to (10),
in which the specific subject is a specific person, and
the identification processing unit performs, as the identification processing, processing of determining whether or not the subject in the second image is a same person as the specific person.
(12)
The signal processing device according to any one of (7) to (10),
in which the identification processing unit performs, as the identification processing, processing of determining whether or not a type of the subject in the second image is a same type as a type of the specific subject.
(13)
An imaging device including:
a pixel array unit in which photoelectric conversion elements are arranged in an array;
a storage unit that stores size information of a specific subject; and
a determination processing unit that acquires a second image as a distance image having a resolution lower than that of a first image used in identification processing of determining whether or not a subject is the specific subject, and performs determination of whether or not the subject in the second image is a processing target subject in the identification processing using the first image on the basis of size information of the subject in the second image and the size information of the specific subject.
(14)
The imaging device according to (13),
in which the pixel array unit outputs the second image.
(15)
The imaging device according to any one of (13) to (14),
in which the determination processing unit performs the determination using a corrected distance image obtained by correcting the distance image on the basis of a luminance signal output from the pixel array unit.
(16)
The imaging device according to any one of (13) to (15),
in which the determination processing unit is provided in a same sensor chip as the pixel array unit.
(17)
A signal processing method performed by a signal processing device, the signal processing method including:
storing size information of a specific subject;
acquiring a second image as a distance image having a resolution lower than that of a first image used in identification processing of determining whether or not a subject is the specific subject; and
determining whether or not the subject in the second image is a processing target subject in the identification processing using the first image on the basis of size information of the subject in the second image and the size information of the specific subject.

REFERENCE SIGNS LIST

1 Imaging device
7 ToF sensor (sensor chip)
10 Storage unit
12 Signal processing unit
21 Pixel array unit
35 Scanning/determination processing unit (determination processing unit)
41 Identification processing unit
BF1 First filter (box filter)
BF2 Second filter (box filter)

The invention claimed is:
1. A signal processing device, comprising:
circuitry configured to:
store size information of a specific subject in a first image, wherein the size information includes a size of the specific subject;
acquire a second image as a distance image, wherein
a second resolution of the second image is lower than a first resolution of the first image, and
the first image is used in an identification processing operation to determine that a subject in the second image is the specific subject;
calculate a similarity between a size of the subject in the second image and the size of the specific subject based on a first box filter and a second box filter, wherein
a size of the first box filter is same as the size of the specific subject, and
a size of the second box filter is larger than the size of the first box filter; and
determine that the subject in the second image is a processing target subject based on the identification processing operation of the first image, wherein
the determination is based on a basis of the similarity between the size of the subject in the second image and the size of the specific subject.

2. The signal processing device according to claim 1, wherein the circuitry is further configured to specify an image area of the processing target subject in the second image as a target area.

3. The signal processing device according to claim 1, wherein in a case where a shape of the specific subject is similar to a shape of the subject in the second image, the circuitry is further configured to determine the subject in the second image as the processing target subject.

4. The signal processing device according to claim 3, wherein the circuitry is further configured to determine that the shape of the specific subject is similar to the shape of the subject in the second image based on edge information extracted from the second image.

5. The signal processing device according to claim 1, wherein the circuitry is further configured to execute the identification processing operation.

6. The signal processing device according to claim 5, wherein the circuitry is further configured to execute the identification processing operation in a case where it is determined that the subject in the second image is the processing target subject in the identification processing of the first image.

7. The signal processing device according to claim 5, wherein the circuitry further configured to:
specify an image area of the processing target subject in the second image as a target area; and
specify an area corresponding to the target area in an area in the first image as a corresponding area.

8. The signal processing device according to claim 7, wherein the circuitry is further configured to execute the identification processing operation on the corresponding area as a target.

9. The signal processing device according to claim 5, wherein
the specific subject is a specific person, and
the circuitry is further configured to execute the identification processing operation based on a determination that the subject in the second image is a same person as the specific person.

10. The signal processing device according to claim 5, wherein the circuitry is further configured to execute the identification processing operation based on a determination that, a first type of the subject in the second image is same as a second type of the specific subject.

11. An imaging device, comprising:
a plurality of photoelectric conversion elements in an array; and
circuitry configured to:
store size information of a specific subject in a first image, wherein the size information includes a size of the specific subject;
acquire a second image as a distance image, wherein
a second resolution of the second image is lower than a first resolution of the first image, and
the first image is used in an identification processing operation to determine that a subject in the second image is the specific subject;
calculate a similarity between a size of the subject in the second image and the size of the specific subject based on a first box filter and a second box filter, wherein
a size of the first box filter is same as the size of the specific subject, and
a size of the second box filter is larger than the size of the first box filter; and
determine that the subject in the second image is a processing target subject based on the identification processing operation of the first image, wherein
the determination is based on the similarity between the size of the subject in the second image and the size of the specific subject.

12. The imaging device according to claim 11, wherein the plurality of photoelectric conversion elements is configured to output the second image.

13. The imaging device according to claim 11, wherein
the plurality of photoelectric conversion elements is configured to output a luminance signal, and
the circuitry is further configured to determine a corrected distance image obtained by correction of the distance image based on the outputted luminance signal.

14. The imaging device according to claim 11, wherein the circuitry is in a same sensor chip as the plurality of photoelectric conversion elements.

15. A signal processing method executed by a signal processing device, the signal processing method comprising:
storing size information of a specific subject in a first image, wherein the size information includes a size of the specific subject;
acquiring a second image as a distance image, wherein
a second resolution of the second image is lower than a resolution of the first image, and
the first image is used in identification processing of determining that a subject in the second image is the specific subject;
calculating a similarity between a size of the subject in the second image and the size of the specific subject based on a first box filter and a second box filter, wherein
a size of the first box filter is same as the size of the specific subject, and
a size of the second box filter is larger than the size of the first box filter; and
determining that the subject in the second image is a processing target subject based on the identification processing using the first image, wherein
the determination is based on the similarity between the size of the subject in the second image and the size of the specific subject.

* * * * *